US011603335B2

(12) United States Patent
Frank

(10) Patent No.: US 11,603,335 B2
(45) Date of Patent: Mar. 14, 2023

(54) NANO PARTICLE AGGLOMERATE REDUCTION TO PRIMARY PARTICLE

(71) Applicant: Blue Horizons Innovations, LLC, Coconut Creek, FL (US)

(72) Inventor: David L. Frank, Highland Beach, FL (US)

(73) Assignee: Blue Horizons Innovations, LLC, Coconut Creek, FL (US)

( * ) Notice: Subject to any disclaimer, the term of this patent is extended or adjusted under 35 U.S.C. 154(b) by 0 days.

(21) Appl. No.: 17/818,814

(22) Filed: Aug. 10, 2022

(65) Prior Publication Data
US 2022/0388916 A1  Dec. 8, 2022

Related U.S. Application Data

(63) Continuation of application No. 17/665,105, filed on Feb. 4, 2022, which is a continuation of application
(Continued)

(51) Int. Cl.
*C04B 35/465* (2006.01)
*C04B 41/00* (2006.01)
(Continued)

(52) U.S. Cl.
CPC ........... *C04B 41/0072* (2013.01); *B01J 6/001* (2013.01); *B07B 4/00* (2013.01); *B07B 11/04* (2013.01);
(Continued)

(58) Field of Classification Search
CPC . C04B 41/0072; C04B 41/009; C04B 35/465; C04B 2235/5454; C04B 2235/3236; B82Y 40/00
See application file for complete search history.

(56) References Cited

U.S. PATENT DOCUMENTS 3,416,207 A    12/1968   Maida
5,470,583 A    11/1995   Na et al.
(Continued)

FOREIGN PATENT DOCUMENTS

WO      2015006030      1/2015

OTHER PUBLICATIONS

Vasylkiv et al. Nano-Blast Synthesis of Nano-size CeO2—Gd2O3 Powders J Am. Ceram. Soc., 89 [6] 1822-1826 (2006).
(Continued)

*Primary Examiner* — Noah S Wiese
(74) *Attorney, Agent, or Firm* — Fleit Intellectual Property Law; Jose Gutman

(57) ABSTRACT

A nanoparticle cluster reduction method yields a new composition of matter including a large percentage (e.g., 75% or higher percentage) of primary nanoparticles in the new composition of matter. The particle reduction method reduces the size of nanoparticle clusters in material of the new composition of matter, allows particle reduction of specific nanoparticle cluster sizes, and allows particle reduction to primary nanoparticles. This new composition of matter can include a high permittivity and high resistivity dielectric compound. This new composition of matter, according to certain examples, has high permittivity, high resistivity, and low leakage current. In certain examples, the new composition of matter constitutes a dielectric energy storage device that is a battery with very high energy density, high operating voltage per cell, and an extended battery life cycle. An example method can include a controlled gas evolution reaction to reduce the size of nanoparticle clusters.

24 Claims, 12 Drawing Sheets

US 11,603,335 B2
Page 2

Related U.S. Application Data

No. 17/204,766, filed on Mar. 17, 2021, now Pat. No. 11,312,663, application No. 17/818,814, which is a continuation of application No. PCT/US2021/022843, filed on Mar. 17, 2021, said application No. 17/204,766 is a continuation-in-part of application No. 17/101,001, filed on Nov. 23, 2020, now Pat. No. 11,257,630, said application No. PCT/US2021/022843 is a continuation-in-part of application No. 17/101,001, filed on Nov. 23, 2020, now Pat. No. 11,257,630, and a continuation-in-part of application No. 16/824,364, filed on Mar. 19, 2020, now Pat. No. 10,961,158, said application No. 17/101,001 is a continuation-in-part of application No. 16/824,364, filed on Mar. 19, 2020, now Pat. No. 10,961,158.

(60) Provisional application No. 63/124,849, filed on Dec. 13, 2020, provisional application No. 63/081,523, filed on Sep. 22, 2020, provisional application No. 63/069,113, filed on Aug. 23, 2020, provisional application No. 63/056,662, filed on Jul. 26, 2020, provisional application No. 62/958,799, filed on Jan. 9, 2020, provisional application No. 62/941,154, filed on Nov. 27, 2019, provisional application No. 62/916,308, filed on Oct. 17, 2019, provisional application No. 62/912,420, filed on Oct. 8, 2019, provisional application No. 62/891,306, filed on Aug. 24, 2019, provisional application No. 62/859,739, filed on Jun. 11, 2019, provisional application No. 62/836,812, filed on Apr. 22, 2019, provisional application No. 62/820,971, filed on Mar. 20, 2019.

(51) Int. Cl.
  *B07B 11/04* (2006.01)
  *B07B 4/00* (2006.01)
  *B01J 6/00* (2006.01)
  *B82Y 40/00* (2011.01)

(52) U.S. Cl.
  CPC .......... *C04B 35/465* (2013.01); *C04B 41/009* (2013.01); *B82Y 40/00* (2013.01); *C04B 2235/3236* (2013.01); *C04B 2235/5454* (2013.01)

(56) References Cited

U.S. PATENT DOCUMENTS

| | | | |
|---|---|---|---|
| 8,512,645 B2 | 8/2013 | Lee et al. | |
| 8,512,672 B2 | 8/2013 | Lee et al. | |
| 9,248,501 B1 | 2/2016 | Johannes et al. | |
| 10,941,464 B1* | 3/2021 | Agarwal | B22D 27/00 |
| 2002/0196957 A1 | 12/2002 | Andersen | |
| 2006/0083694 A1 | 4/2006 | Kodas et al. | |
| 2006/0120020 A1 | 6/2006 | Dowgiallo, Jr. | |
| 2008/0003364 A1 | 1/2008 | Ginley et al. | |
| 2008/0220153 A1 | 9/2008 | Mukherjee et al. | |
| 2011/0171364 A1 | 7/2011 | Xing et al. | |
| 2012/0171420 A1 | 7/2012 | Molins et al. | |
| 2013/0320274 A1* | 12/2013 | Walters | C01B 32/174 252/511 |
| 2014/0022694 A1 | 1/2014 | Reynolds et al. | |
| 2014/0374642 A1 | 12/2014 | Shen et al. | |
| 2015/0038593 A1 | 5/2015 | Gogotsi et al. | |
| 2016/0038745 A1 | 2/2016 | Faltys et al. | |
| 2017/0324057 A1 | 11/2017 | Friend et al. | |
| 2018/0134563 A1 | 5/2018 | Mochalin et al. | |

OTHER PUBLICATIONS

International Search Report dated Mar. 26, 2021 issued for International Application No. PCT/US20/61726.
Written Opinion of the International Searching Authority dated Mar. 26, 2021.
Kan et al., "Battery Capacitor Combinations in Photovoltaic Powered Products", Journal of Power Sources 2006 pp. 1-9 entirety of document especially p. 1 paragraph 1, 2006.
Wikipedia "Ceramic Capacitor" Nov. 18, 2016 (Nov. 18, 2016) retrieved from <https://en.wikipedia.org/windex.php?title=Ceramic_capacitor&oldid=750236745> entirety of document especially p. 3 paragraph 5 2018.
Wikipedia "Sol-gel Process" Nov. 23, 2018 (Nov. 23, 2018) retrieved from <https://en.wikipedia.orgiw/index.php?title.Aluminum_oxide&oldid=870135592> entirety of document especially p. 3, Table 1 2018.
Wikipedia "Aluminum Oxide" Nov. 22, 2018 (Nov. 22, 2018) retrieved from <https://en.wikipedia.orgiw/index.php?title.Aluminium_oxide&oldid=870135592> entirety of document especially p. 3 Table 1 2018.
Wikipedia "Calcium copper Titanate" Nov. 28, 2017 (Nov. 28, 2017) retrieved from ,https://en.wikipedia.org/w/index.php?title=Calcium_copper_titanate&oldid=812515889 entirety of document especially p. 1 Table 1 2017.
PCT Notification of Transmittal of International Search Report and The Written Opinion of the International Searching Authority dated Sep. 1, 2020.
PCT Notification of Transmittal of International Search Report and The Written Opinion of the International Searching Authority dated May 27, 2021.
PCT Notification of Transmittal of International Search Report and The Written Opinion of the International Searching Authority dated Nov. 21, 2017.

* cited by examiner

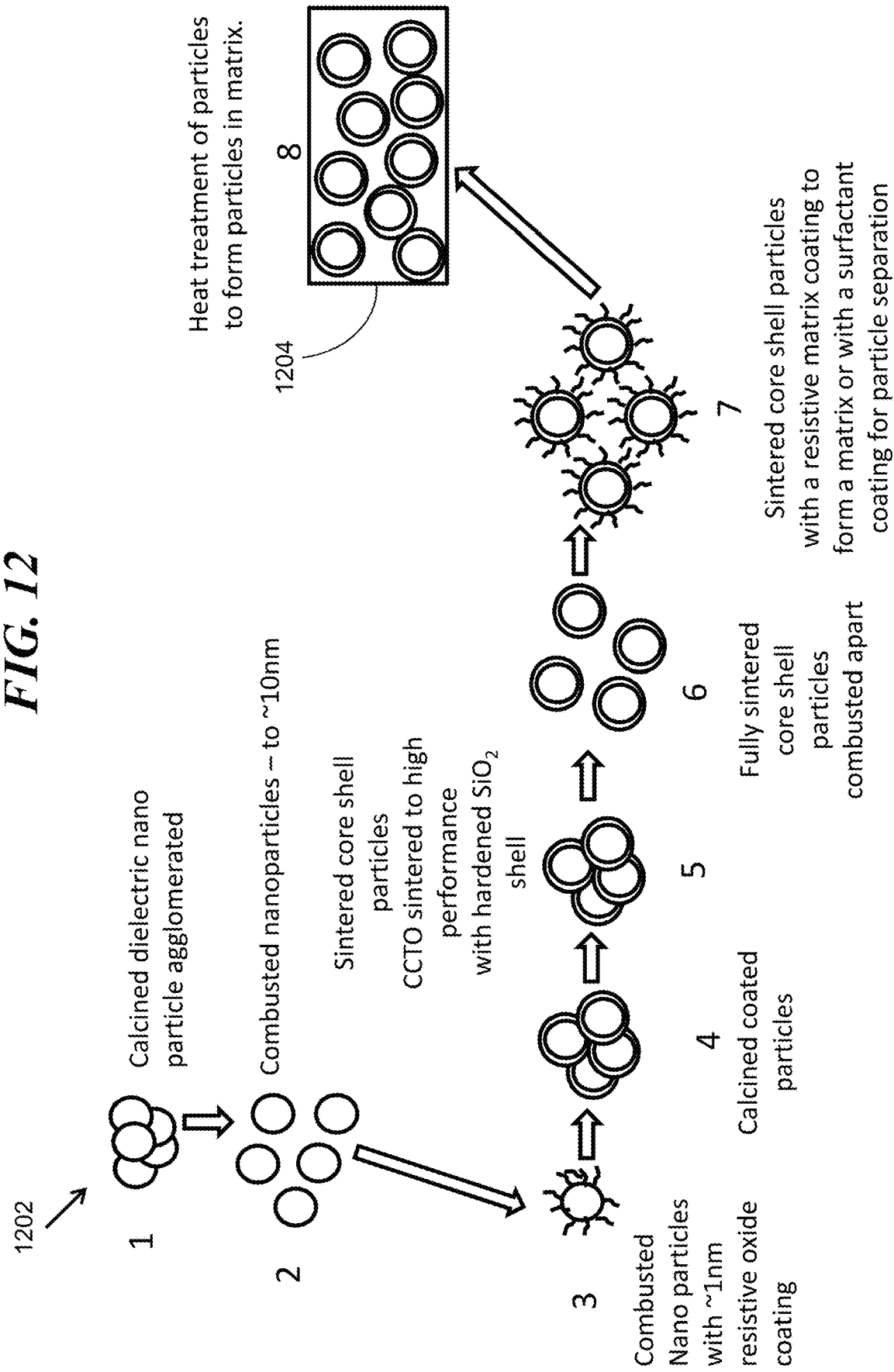

NANO PARTICLE AGGLOMERATE REDUCTION TO PRIMARY PARTICLE

BACKGROUND

The present disclosure generally relates to the reduction of nanoparticle clusters, such as agglomerated or aggregated nanoparticles, to primary nanoparticles for use in a wide variety of devices and applications. Primary nanoparticles (also referred to as primary particles) typically include one or more very fine nanoparticles and/or a small cluster of very fine nanoparticles. Each primary nanoparticle typically measures less than or equal to approximately 20 nm in a critical dimension of each such primary nanoparticle. Current nanoparticle particle reduction methods lead to particle reduction of agglomerated nanoparticles (e.g., a group of primary nanoparticles) that are each larger, when measured in a critical dimension of the agglomerated nanoparticle, than a primary nanoparticle, when measured in a critical dimension of the primary nanoparticle. These agglomerated nanoparticles are typically not separable using conventional particle reduction methods. These agglomerated nanoparticles accordingly restrict the ability to maintain primary nanoparticles in a particular material volume.

One example application of nanoparticles is in particle reduction of devices and systems for energy storage and energy generation. Agglomerated nanoparticles in this example application fail to offer a full performance of primary nanoparticles. Many such devices and applications demand high energy density, high operating voltage per cell, and an extended battery life cycle. Agglomerated nanoparticles adversely affect energy storage capabilities, and other operational parameters, of these devices and applications.

Therefore a need exists to overcome the problems with the prior art as discussed above.

BRIEF SUMMARY

The present disclosure generally relates to a new system and method of separating nanoparticles from a nanoparticle cluster, such as from a nanoparticle aggregate and/or from agglomerated nanoparticles, to reduce the nanoparticle cluster to include one or more primary nanoparticles. According to various embodiments, the new method uses a controlled calcination temperature, a controlled combustion of calcined particles, and an optional surfactant applied to the calcined particles during agitation of combusted calcined particles. According to an example embodiment of this process the combusted nanoparticle cluster is comprised of smaller nanoparticles with the same chemical composition as the original nanoparticle cluster. According to various embodiments, one or more chemicals may be added to the original nanoparticles, such as from the nanoparticle aggregate(s) or from the agglomerated nanoparticles, as part of the combustion process.

Nanoparticles are important to a wide variety of new devices and new applications. A primary nanoparticle includes one or more very fine nanoparticles, which can include either one or more individual very fine nanoparticles or a small cluster of very fine nanoparticles, which typically measures less than or equal to approximately 20 nm in a critical dimension of each such primary nanoparticle.

When forming very fine nanoparticles using conventional particle reduction methods there is a high probability that the very fine nanoparticles will group together (agglomerate) to form one or more agglomerated nanoparticles. Each such agglomerated nanoparticle measures, in a critical dimension of such agglomerated nanoparticle, a much greater size than the size measured for a primary nanoparticle (i.e., the size of an agglomerated nanoparticle can be >>20 nm in a critical dimension of each such agglomerated nanoparticle). For example, such agglomerated nanoparticle may measure greater than 50 nanometers, and more commonly greater than 100 nanometers or greater than 500 nanometers, or even greater, in a critical dimension of such agglomerated nanoparticle. This agglomeration of nanoparticles can occur very quickly when primary nanoparticles are physically in close proximity to each other. Additionally, agglomerated nanoparticles can quickly become very hard and difficult to separate into individual primary nanoparticles. These agglomerated nanoparticles are not separable using conventional particle reduction methods. Such formation of agglomerated nanoparticles restricts the ability to form a material that includes a large percentage (e.g., 75% or higher percentage) of primary nanoparticles in a defined volume of the material.

New technologies for energy storage and energy generation can utilize very fine nanoparticles in a matrix. These very fine nanoparticles have higher surface area and higher energy, when compared to the nanoparticle aggregate(s) and/or the agglomerated nanoparticles. High surface area to volume ratio of nanoparticles provides a very high surface energy.

Very fine nanoparticles tend to agglomerate to form agglomerated nanoparticles and accordingly reduce or minimize the surface energy of the agglomerated nanoparticles.

Uncontrolled agglomeration of nanoparticles can occur from, for example, attractive Van der Waals forces between the nanoparticles in close proximity to each other. The Van der Waals attraction and agglomeration can occur very quickly as synthesized nanoparticles begin to cool from a heated state. In the heated state, these nanoparticles can form bonds resulting in hard agglomerate (e.g., agglomerated nanoparticles) that conventional particle reduction methods fail to disrupt and separate into primary nanoparticles.

This naturally occurring agglomeration of nanoparticles reduces the ability to create discrete very fine nanoparticles, and is especially prevalent in oxide particles. Standard processes, such as sonification, ball milling, and microfluidics, are not effective at reducing these nanoparticle agglomerates (or agglomerated nanoparticles).

According to various embodiments, a modified internal barrier layer capacitor material comprises: a base material comprising unmodified internal barrier layer capacitor material having grain boundaries; one or more resistive materials bonded to the grain boundaries of the base material to form modified grain boundaries of the base material, wherein a first resistive material of the one or more resistive materials is bonded to grain boundaries of the unmodified internal barrier layer capacitor material forming a modified internal barrier layer capacitor material which includes nanoparticles of the one or more resistive materials added to nanoparticles of the unmodified internal barrier capacitor material; and an amorphous region in between the grain boundaries of the modified internal barrier layer capacitor material, the amorphous region including nanoparticles of the one or more resistive materials, and wherein at least one of the base material and the one or more resistive materials, comprises at least 75% or higher percentage of primary nanoparticles relative to all particles in a defined volume of the respective at least one of the base material and the one or more resistive materials.

According to various embodiments, a modified internal barrier layer capacitor material comprises a base material comprising unmodified internal barrier layer capacitor material having grain boundaries; a first resistive material bonded to grain boundaries of the base material, and a second resistive material bonded to grain boundaries of the base material, to form modified grain boundaries of the base material. The first resistive material is bonded to grain boundaries of the base unmodified internal barrier layer capacitor material forming a grain boundary composition including nanoparticles of the first resistive material added to nanoparticles of the unmodified internal barrier layer base capacitor material.

The second resistive material is bonded to grain boundaries of the grain boundary composition, and forms a modified internal barrier layer capacitor material including nanoparticles of the second resistive material added to nanoparticles of the grain boundary composition. An amorphous region, in between the grain boundaries of the modified internal barrier layer capacitor material, includes nanoparticles of at least one of the first and second resistive materials. At least one of the base material, the first resistive material, or the second resistive material, comprises at least 75% or higher percentage of primary nanoparticles relative to all particles in a defined volume of the respective at least one of the base material, the first resistive material, or the second resistive material.

According to various embodiments, material of at least one of the base material, the first resistive material, or the second resistive material, comprises at least 95% or higher percentage of primary nanoparticles relative to all particles in a defined volume of the respective material.

According to certain embodiments, material of at least one of the base material, the first resistive material, or the second resistive material, comprises 99% or higher percentage of primary nanoparticles relative to all particles in a defined volume of the respective base material, the first resistive material, or the second resistive material.

According to various embodiments, the modified internal barrier layer capacitor material has a dielectric permittivity of at least 50,000; a resistivity of at least $10^{12}$ ohms/centimeter; and a dielectric strength of at least 50 volts per micron of thickness.

a) According to various embodiments, an example of a reduction of nanoparticle grouping (e.g., including one or more agglomerated nanoparticles and/or aggregated nanoparticles) in a particle reduction process, comprises one or more of the following steps.

In one embodiment, clustered nanoparticles are separated during a controlled gas evolution reaction (CGER). Nanoparticle clusters are mixed and stirred with nitric acid in a solution. The nitric acid is allowed to soak the nanoparticle clusters and embed in between the nanoparticles that comprise the nanoparticle cluster.

After sufficient soaking, according to various embodiments, an alcohol fuel such as ethanol or methanol is added to the solution.

According to various embodiments, a self-starting near room temperature controlled gas evolution reaction (CGER) occurs between the nitric acid and die fuel.

The result is:
Empirical formula of Ethanol is $C_2H_{60}$
Empirical formula of Nitric acid is $HNO_3$

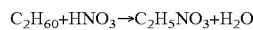
$C_2H_{60} + HNO_3 \rightarrow C_2H_5NO_3 + H_2O$

According to various embodiments, the use of the CGER combustion process is not to synthesize new materials but to separate nanoparticles that are already formed and grouped into hard nanoparticle clusters such as agglomerates or aggregates. In these embodiments, the use of the CGER combustion process breaks apart nanoparticle groupings which according to various embodiments can result in material that includes a large percentage (e.g., 75% or higher percentage) of primary nanoparticles relative to all particles in a defined volume of the material.

A surfactant, according to various embodiments, can be added to a solution with the combusted nanoparticles (e.g., comprising a large percentage of separated primary nanoparticles following the CGER combustion process) to coat the combusted nanoparticles and agitating the plurality of combusted nanoparticles (e.g., agitating nanoparticle groupings and primary nanoparticles) in said solution that has a pH that represents the isoelectric point of the combusted nanoparticles.

According to the various embodiments, a particle reduction process separates the plurality of surfactant coated nanoparticles from the pH solution.

The particle reduction process described in the example above can include a CGER combustible solution that comprises one or more of an ethanol, a propanol, a solvent, an acid, or other liquids, that could result in a CGER combustion process.

The particle reduction process described in the example above applies heat to the CGER combustible solution to initiate the combustion. The process, according to various embodiments, applies calcination heat treatment to the nanoparticle materials at a temperature range that is approximately 50° C. or more, according to the lowest melting point of the constituents that comprise the nanoparticle material. According to certain embodiments, the process can apply near room temperature to the solution that creates microcombustions that break apart the nanoparticle groupings in the solution into smaller groupings and/or separate primary particles in the solution.

The particle reduction process described in the example above, according to various embodiments, includes agitation that can be performed by a wide variety of processes including one or more of stirring, ball milling, bead milling, sonification, or jet microfluidics.

The particle reduction process described in the example above, according to various embodiments, can create calcine heated surfaces of nanoparticles in the nanoparticle groupings which become soft and form a hard interconnection, when cooled, between the nanoparticles at interfacial contacts between adjacent nanoparticles.

The particle reduction process described in the example above, according to various embodiments, can include nanoparticle groupings that are subjected to the CGER combustion process, which comprise one or more Van der Waals formations of nanoparticles.

The particle reduction process described in the example above, according to various embodiments, can include nanoparticle groupings that include one or more agglomerated nanoparticles and/or aggregated nanoparticles, and which are formed as an ionic bond between oxygen atoms of adjacent nanoparticles.

The particle reduction process described in the example above, according to various embodiments, can include nanoparticle groupings that include one or more agglomerated nanoparticles and/or aggregated nanoparticles, and which are formed as a covalent bond between metal and non-metal atoms of adjacent nanoparticles.

The particle reduction process described in the example above, according to various embodiments, can include nanoparticle groupings that include one or more agglomerated nanoparticles and/or aggregated nanoparticles, and which are formed as a metallic bond between atoms of adjacent nanoparticles.

The particle reduction process described in the example above, according to various embodiments, can include nanoparticle groupings that include one or more agglomerated nanoparticles and/or aggregated nanoparticles, and which are formed from one or more of the following bond types: Van der Waals, ionic, covalent, or metallic.

The particle reduction process described in the example above, according to various embodiments, can include nanoparticle groupings that are reduced to material that comprises at least 75% or higher percentage of primary nanoparticles in the respective material.

The particle reduction process described in the example above, according to various embodiments, can include nanoparticle groupings that are reduced to material that comprises at least 95% or higher percentage of primary nanoparticles in the respective material.

The particle reduction process described in the example above, according to various embodiments, can include nanoparticle groupings that are reduced to material that comprises at least 99% or higher percentage of primary nanoparticles in the respective material.

The particle reduction process described in the example above, according to various embodiments, can include an agglomeration of nanoparticles that is reduced to nanoparticle clusters of primary nanoparticles. For example, and not for limitation, the agglomeration of nanoparticles can be reduced to nanoparticle clusters of ten nanoparticles or less. As another example, and not for limitation, the agglomeration of nanoparticles can be reduced to nanoparticle clusters of one hundred nanoparticles or less.

The particle reduction process described in the example above, according to various embodiments, can include an agglomeration of nanoparticles that is reduced to nanoparticle clusters of one hundred (100) or less individual primary nanoparticles.

The particle reduction process described in the example above, according to various embodiments, can include a plurality of nanoparticles that includes perovskite materials. According to certain embodiments, the plurality of nanoparticles includes at least one primary nanoparticle that comprises perovskite material.

The particle reduction process described in the example above, according to various embodiments, can include a plurality of nanoparticles that includes perovskite materials applied in a dielectric energy storage material.

The particle reduction process described in the example above, according to various embodiments, can include a plurality of nanoparticles that comprise perovskite material in a matrix composed of reduced one or more nanoparticle groupings. According to certain embodiments, the matrix includes embedded nanoparticles that are reduced, according to the particle reduction process described in the example above, to material that comprises at least 75% or higher percentage of primary nanoparticles in the respective material.

According to various embodiments of the particle reduction process described in the example above, the plurality of nanoparticles comprises material embedded in a matrix that includes embedded nanoparticles of perovskite nanoparticles. According to various embodiments of the particle reduction process described above, the plurality of nanoparticles comprises material embedded in a matrix that includes embedded nanoparticles of calcium copper titanate (CCTO) embedded in $SiO_2$ to form a matrix. In certain embodiments the CCTO particles are combined with aluminum oxide ($Al_2O_3$) prior to being embedded in a $SiO_2$ matrix. In certain embodiments, the matrix is applied in a capacitor device. In certain embodiments, the matrix is applied in a Dense Energy Ultra-Cell energy storage device. In certain embodiments, the matrix is applied in a photovoltaic energy generation device.

b) According to various embodiments of the particle reduction process described above in a), the plurality of nanoparticles comprises material embedded in a matrix that includes modified internal barrier layer capacitor material for a dielectric energy storage layer, and which further comprises: an unmodified internal barrier layer capacitor (IBLC) material, comprised of at least one of clustered Dielectrum nanoparticles or primary Dielectrum nanoparticles that are less than 20 nm in diameter (or measured less than 20 nm in a critical dimension of each of the clustered nanoparticles or primary nanoparticles).

The Dielectrum particle is defined as an internal barrier layer capacitor particle that is less than 20 nm in diameter and encapsulated by a resistive matrix. The Dielectrum particle can be further divided into its chemical constituents as opposed to a quantum particle that cannot be divided any further.

In fact, when a process treats calcium copper titanate (CCTO) with an acid bath or controlled gas evolution reaction (CGER), according to various embodiments, the CCTO nanocrystals are not affected, or broken down further, but separated from each other.

To be clear, CCTO primary particles that are a result of the acid bath or controlled gas evolution reaction (CGER) are not quantum particles. Quantum particles are the smallest entity of a physical quantity that cannot be divided any further. For example, an electron is a quantum particle. Protons and neutrons are not quantum particles as they are composed of quarks. Similarly, a photon is a quantum particle.

A quantum particle is further described mathematically by a special quantum kind of wave called a wave function. When interference occurs, each particle's wave function includes parts corresponding to the particle, going each way, much like the way that a classical wave that interferes has parts going both ways. A chemical species is a chemical substance or ensemble composed of chemically identical molecular entities that can explore the same set of molecular energy levels on a characteristic or delineated time scale. These energy levels determine the way the chemical species will interact with others engaging in chemical bonds, e A quantum species can be, atom, molecule, ion, radical, and it has a chemical name and chemical formula.

c) According to various embodiments of the particle reduction process described in the example above in b), nanoparticles of a first resistive material are bonded to grain boundaries of the unmodified IBLC material thereby resulting in a modified grain boundary composition.

d) According to various embodiments of the particle reduction process described in the example above in c), nanoparticles of a second resistive material are bonded to the modified grain boundary composition thereby resulting in a modified internal barrier layer capacitor material.

e) According to various embodiments of the particle reduction process described in the example above in d), a second resistive material is applied as a suspension resulting in the modified internal barrier layer capacitor material having grain boundary suspended in a resistive matrix.

f) According to various embodiments of the particle reduction process described in the example above in e), the modified internal barrier layer capacitor material and matrix result in an integrated grain boundary region. Where, in certain embodiments, the modified internal barrier layer capacitor material, when equally distributed in the second resistive material and a resistive dielectric matrix, exhibits higher dielectric characteristics than dielectric nanoparticles greater than 50 nm and which are distributed in a matrix. Where, in certain embodiments, said resistive dielectric matrix is applied as the dielectric energy storage layer in a multilayer ceramic capacitor. Where, in various embodiments, said multilayer ceramic capacitor comprises an energy storage device.

g) The particle reduction process described in the example above in a), where the plurality of nanoparticles are comprised of nanoparticles including a bond between two lithium atoms ($Li_2$) with one or more additives including a metal oxide or metal phosphate or metal sulfide that comprise the core of a core shell particle for application as a lithium-ion battery electrode composition.

According to certain embodiments, the lithium-ion battery electrode composition comprises a composite core material that is reduced to a particle size of between 1 nanometer and 0.5 micron.

According to certain embodiments, the lithium-ion battery electrode composition described in the example above in g) comprises oxide additives that are porous. According to various embodiments, the lithium-ion battery electrode composition described in the example above in g), includes a shell of a core-shell composite comprising conductive carbon. According to various embodiments, an electrode comprises the lithium-ion battery electrode composition described in g), wherein an overall thickness of the electrode is larger than about 60 microns.

A challenge for lithium iron phosphate $LiFePO_4$ (LFP) batteries is that they have a much lower energy density than lithium nickel manganese cobalt oxide (NMC) batteries and lithium nickel cobalt aluminum oxide (NCA) batteries. The original LFP technology only had a 90 to 120 Wh/kg battery density. Recent reduction from LFP micron particles to around 200 nm LFP nanoparticles reached capacities of 160 Wh/kg. For comparison the Tesla NMC 2170 cells made by Panasonic are somewhere around 247 Wh/kg.

The inventor has discovered that an embodiment of the current invention allows LFP particle reduction from around 100 nm down to around 5 nm which further enhances LFP battery production.

An embodiment of the current invention can include one or more specific particle sizes. According to an embodiment of the current invention, a cathode active material in a solid state battery comprises cathode active particles with particle sizes down to 5 nm.

h) A particle reduction process according to an embodiment of the current invention, provides for lithium iron phosphate ($LiFePO_4$) applied as a cathode material in a lithium iron phosphate battery, and in certain embodiments wherein the cathode material particle size is reduced to between around 1 nm to around 0.5 microns.

The cathode material, according to an embodiment of the particle reduction process described in the example above in h), wherein the reduction of particle size of the $LiFePO_4$ particles creates reduced pore diameter (or measured in a critical dimension of a pore) in the cathode material thereby increasing overall cathode surface area while reducing cathode material particle size to between around 1 nm to around 0.5 microns. The cathode material with reduced particle size provides increased energy density for the $LiFePO_4$ batteries based on an increased cathode surface area resulting in an increased reaction rate, shorter diffusion lengths, and a raised operational voltage. The cathode material with reduced particle size provides increased cathode conductivity raising the $LiFePO_4$ battery operating voltage from 3.2 volts to between 3.5 volts to 4.2 volts. The cathode material with reduced particle size also provides increased cathode conductivity allowing for more rapid charge times and an increased number of charge cycles.

The ability to create smaller particle sizes is highly desirable in the battery industry, but attempts to create smaller particle sizes encounters serious challenges and drawbacks using conventional particle reduction methods. Smaller particle sizes also enable improved charge time, extended run time, and improved power, for a battery.

Various embodiments of the present invention provide a process to enable the production of discrete primary particles and/or to reduce the size of the nanoparticle agglomerates, and to yield a percentage of primary particles in a volume of material that includes at least 75% or higher percentage of primary nanoparticles relative to all particles in a defined volume of the respective material. In certain embodiments, the volume of material includes at least 95% or higher percentage of primary nanoparticles in the respective material. In certain embodiments, the volume of material includes at least 99% or higher percentage of primary nanoparticles in the respective material.

By reducing the size of the nanoparticle agglomerates, and accordingly increasing a percentage of primary particles, in a volume of material, a wide variety of improved devices and applications provide enhanced performance. Energy storage devices are of particular interest. For example, the reduction of lithium-based oxide particles in an energy storage device enable high surface area within an electrode and result in an increased energy density, increased operational voltage, more rapid charging and an increase in recharge cycles without substantial battery degradation. Additionally, the reduction of size of dielectric oxide particles suspended in a resistive matrix of a dielectric energy storage layer of an energy storage device, for example of a capacitor device and/or of an energy storage device, improves capacitance, resistivity, breakdown voltage, and overall performance parameters of the device.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 12 is a flow diagram illustrating an example set of operations in multi-phase heat processing of nanoparticles to create fully heat treated (e.g., sintered) dielectric nanoparticles in a matrix.

DETAILED DESCRIPTION

Figure 1:
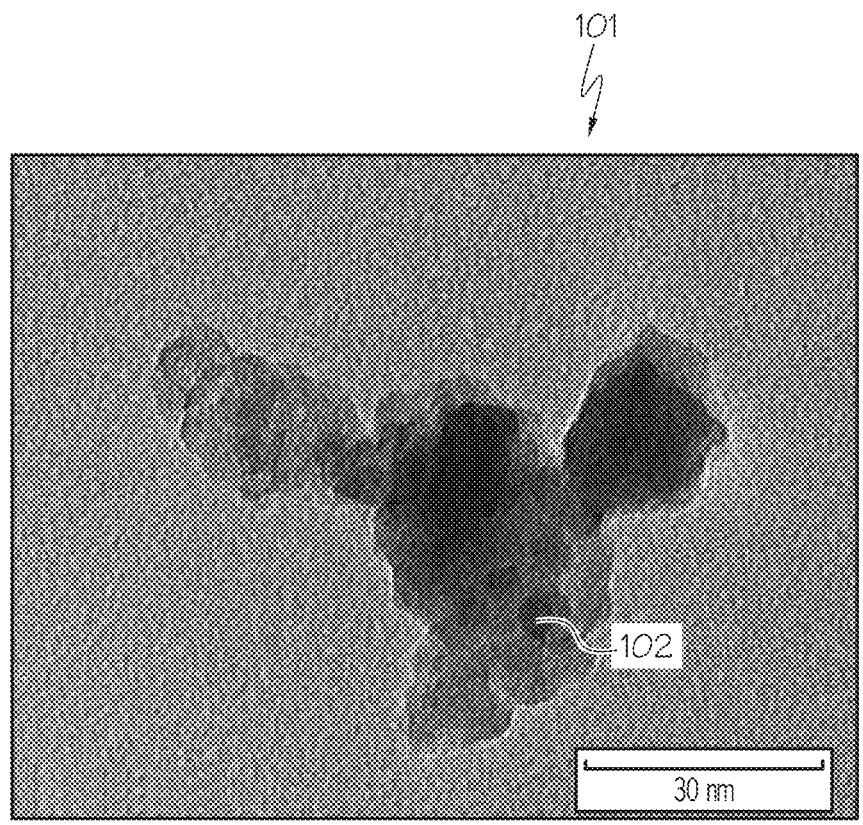
FIG. 1 is an illustration of an example of a single grain (e.g., a primary nanoparticle) connected to an agglomerated nanoparticle, in a material volume of an Internal Barrier Layer Capacitor (IBLC) Material.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically.

The present disclosure generally relates to a new particle reduction method for fabricating a new composition of matter that includes a greater than 75% percentage of primary nanoparticles relative to all particles in a defined volume of the respective material. More specifically, a new compound, for example, includes two or more highly resistive materials that are integrated into a chemistry of a grain boundary of an internal barrier layer capacitor material including a greater than 75% percentage of primary nanoparticles relative to all particles in a defined volume of the respective material.

This new composition of matter results, for example, in a high permittivity of a dielectric compound, a high resistivity of the dielectric compound, and a low leakage current and high breakdown voltage of the dielectric compound, thereby enabling a highly efficient energy storage dielectric material.

In one example, a new compound is formed by a sequential addition of two or more highly resistive materials that increase an internal barrier layer capacitor material resistivity and therefore increase the ability to apply a strong voltage across the internal barrier layer capacitor material. The inventor has discovered that by adding multiple resistive materials to calcium copper titanium oxide (CCTO) in a specific sequence it modifies the chemistry of the CCTO outer grain boundary. When certain resistive materials are added in the correct sequence and correct methods, the permittivity, resistivity and breakdown voltage can be optimized. Additionally, the inventor has discovered that by applying a novel particle reduction method to one or more materials (typically oxide materials) for adding into the internal barrier layer capacitor material a new compound is formed comprising an internal barrier layer capacitor material including a greater than 75% percentage of primary nanoparticles relative to all particles in a defined volume of the respective material. This novel particle reduction method, for example, results in a highly efficient energy storage dielectric material.

The small size of very fine nanoparticles (e.g., primary nanoparticles) allows them to have unique characteristics that may not be possible on a macro-scale.

According to various embodiments, the dielectric energy storage material includes an internal barrier layer capacitor material nanoparticles encapsulated in a resistive material forming core shell nanoparticles in a core shell nanoparticles material. The core shell nanoparticles material, for example, can be heat treated to between 600° C. to 1,000° C. which hardens the shell material. The core shell nanoparticles material can be further heated to between 900° C. to 1,100° C. which sinters the core material forming fully sintered core shell nanoparticles material. The fully sintered core shell nanoparticles material is combined with a resistive material (e.g., $SiO_2$ and/or another oxide material) which form a loaded matrix that is loaded with the core shell nanoparticle material. The loaded matrix is heat treated to form a hardened loaded matrix material. This matrix material can also be referred to as one or more of a dielectric energy storage material, a dielectric energy storage material matrix, dielectric energy storage matrix, or the like.

According to various embodiments, the core of the core shell nanoparticles is comprised of calcium copper titanate (CCTO), the shell is comprised of $SiO_2$, and the matrix is comprised of $SiO_2$. In certain embodiments, the core of the core shell particles is comprised of calcium copper titanate (CCTO) doped with one or more of the following materials: $Al_2O_3$ (Aluminium Oxide), Ru (Ruthenium), La (Lanthanum), or $TeO_2$ (Tellurium oxide).

The terms "agglomerate" and "aggregate" are widely used by powder technologists to describe assemblages of particles that are found in dry powders and powders in liquid suspensions. Each term has a specific meaning. According to one example embodiment, the present disclosure uses the term agglomerate for the assembly of nanoparticles in a powder, typically derived from Van Waals force where nanoparticles closely packed form electrical connections with each other.

The inventor has discovered that nanoparticle agglomeration can be broken (separated) apart by agitating the agglomerated nanoparticles in a liquid, as discussed in more detail herein. The separated nanoparticle agglomerations can result in material including one or more individual nanoparticles and primary nanoparticles. The inventor has also discovered that nanoparticle agglomerations can be broken (separated) apart by a combustion process. For example, as discussed in more detail herein, a controlled as evolution reaction (CGER) creates low temperature micro-combustions, without flame, that can effectively separate nanoparticle agglomerations resulting in material including one or more individual nanoparticles and primary nanoparticles.

According to an embodiment of the invention, the term aggregate for nanoparticle agglomeration can lead to the formation of nanomaterial compounds including nanocrystals as heat-treated materials form hard co Example of Chemical Bonds in Nanotechnology Material properties in micro and nano dimensions differ dramatically from bulk properties. Besides the dominant role of surfaces and interfaces, the inter-particle bonds become stronger as the particle size is reduced. In many cases, these bonds create a nanostructure (e.g., a crystal structure) or cluster of nanoparticles bound together. Different types of inter-particle bonds have different bonding strengths.

These nanoparticle bonds can be divided into classes of bond types. The importance of weak bonds increases with the increasing size of the aggregates constructed. For stronger bonds, the differentiation of bond types is based on the parallel existence of interactions with a wide range of strengths and characters.

Example of Van der Waals Interactions

All shells of atoms interact with each other. When atoms approach each other, the electrons of one atom deform the distribution of the electrons of the other atom. This deformation disturbs the charge distribution in a way such that the sum of the energy of the two approaching atoms is lower than the sum of the atoms initially. This difference in energy determines the strength of the bond.

The Van der Waals bond is a weak bond. At room temperature, the bond between individual atoms can be easily thermally activated and broken. The pH of a nanoparticle solution can be modified to neutralize the bond with agitation applied through stirring, sonification, milling, and other agitation methods.

Van der Waals bonding is important in nanotechnology, because the building units are usually solids and consist of molecules instead of individual atoms. If two or more atoms are connected by strong ionic, covalent, coordinative, or metal bonds, then interactions of electron shells of these atoms with interface surfaces and molecules are in conjunction with the Van der Waals bonds.

Example of Ionic Bonds

Where there are large differences in the electro-negativities of atoms, a transfer of one or more electrons from the less to the more electronegative interacting partner is observed. The resulting bond is not determined by the bonding electrons, but by the interactions of the ions created by the electron transfer. The strength of this bond is comparable to a covalent bond; it is, therefore, a strong chemical interaction. Some examples of ionic bonds are calcium oxide, copper oxide, or titanium oxide. The ionic bond is between a metal and non-metal.

Example of Covalent Bonds

A covalent bond in chemistry is a chemical link between two atoms or ions in which the electron pairs are shared between them. A covalent bond may also be termed a molecular bond. Covalent bonds form between two non-metal atoms with identical or relatively close electronegativity values. This type of bond can also be found in other chemical species, such as radicals and macromolecules.

The electron pairs that participate in a covalent bond are called bonding pairs or shared pairs. Typically, sharing bonding pairs allows each atom to achieve a stable outer electron shell, similar to that seen in noble gas atoms.

Example of Metal Bonds

The creation of strong chemical bonds by exchange of binding electrons can also take place without asymmetric distribution of the electron density. If the exchange occurs only in one direction, a single covalent bond is created. If the exchange takes place in several spatial directions and is further combined with a high mobility of the binding electrons, a metal bond is created.

Through the simultaneous existence of bonds in various spatial directions, the metal bond is present in a three-dimensional network of equal bonds. Clusters are created where a limited number of atoms are involved. For large numbers of atoms, an extended binding network leads to a three-dimensional solid.

The metal bond is of special interest in micro-technology and nano-technology due to the broad application of metals and semiconductors as electrical or electronic materials. Additionally, metal bonds facilitate adhesion and provide both electrical and thermal conductivity at interfaces between different metals and inside alloys.

Completeness or discontinuity of metal bonds in the range of molecular dimensions inside ultrathin systems determines the nano-technological functions. Items such as tunneling barriers realized by local limitations of the electron mobility or the arrangement of ultrathin magnetic layers for magneto-resistive sensors lead to a change in magnetic properties at constant electrical conductivity.

Example of Hydrogen Bridge Bonds

The hydrogen bond is a specific case of a polar covalent interaction. It is based on hydrogen atoms, which create interactions between two atoms of strong electro-negative elements. In this way, one of the atoms is strongly bound as a covalent binding partner, and the second significantly weaker.

A classic case of hydrogen bonds occurs in water, where they are responsible for the disproportionately high transition points of water. The individual hydrogen bond is of relatively low energy, distributing only a weak contribution to the overall energy. In addition, it is easily cleaved. However, several hydrogen bonds between two molecules can stabilize the created aggregate significantly by inducing a cooperative binding.

Hydrogen bonds lead to less specific adsorption processes; therefore, they belong to the class of bonds responsible for disturbances at surface modifications or on layer deposition. In contrast to Van der Waals bonds and dipole-dipole interactions, hydrogen bonds are localized and oriented. They contribute significantly to specific interactions. In this respect, they are similar to coordinative bonds. Therefore, hydrogen bonds play an important role in both the supra-molecular chemistry and the super-molecular synthesis of biomolecule.

Heat and sintering agglomeration require relatively high temperatures that are used to develop a melt layer on the particle surface. As with the other agglomeration mechanisms, wetting now becomes the driver for particle agglomeration, which becomes rigid upon cooling. This type of agglomeration is often called sintering, and it can occur well below the bulk material melt temperature. As a rule of thumb, surface wetting of a heated particle can occur at temperatures as low as ⅔ the bulk material melt temperature. Sintering may also arise if solid bridges are formed at particle contacts, as may occur with sublimation, crystallization, or solute deposition.

Temperature also should be considered. Higher temperature can make the particles sticky before they melt (the surface is already melted). Lowering the temperature even slightly could have positive results.

In the example embodiment described below calcium copper titanate (CCTO) is used as an example nanoparticle material that has nanoparticle grouping because of Van der Waals forces and ionic bonding. Any oxide nanoparticles could have the same grouping when synthesizing nanoparticles resulting in larger particle agglomerates.

Example of a Calcination Process

The process of calcination (by heat treatment) can be used to purify a chemical composition and form an oxidized network of the chemical constituents. Calcination is typically carried out in a furnace or reactor of various designs including shaft furnaces, box furnaces, microwave ovens, and other designs.

The process of calcination for CCTO nanoparticles includes the following:

During the calcination process for nano compounds such as calcium copper titanate oxide, a nanocrystal, the individual chemical constituents of calcium, copper and titanate merge and oxidize to form calcium copper titanate oxide (CCTO). Contaminants are burned off in the early stages of the calcination process. For example, to calcine a calcium copper titanate Sol-Gel, the dried Sol-Gel would be heated to around 500° C. to burn off any contaminants and then raise the temperature to around 800° C. to oxidize and form the calcium copper titanate oxidized network.

The melting point of each of these chemicals are provided below:

Calcium 1,548° F. (842° C.)
Copper 1,984° F. (1,085° C.)
Titanate 3,034° F. (1,668° C.)

The calcination temperature to form CCTO from the chemical constituents is ~800° C. With the melting point of calcium of 847° C., the calcium on the surface of the newly formed nanoparticle becomes tacky. Interfacial (interface) contact between particles can become hard interconnections as the particles cool. This creates a "neck" (interconnection) between the particles that form an aggregate.

This interconnection between the particles, for example, probably begins as a Van der Waals attraction and the interfacial (interface) contact between the particles could create one or more of the following: an oxygen to oxygen ionic bond between the particles, a metal to oxygen (e.g., calcium to oxygen) bond between the particles, or a metal to metal interconnection bond, such as between two calcium particles. The result is an aggregated nanoparticle cluster that has a hard interconnection between the nanoparticles.

To free up the aggregated nanoparticles such as to create primary particles, according to various embodiments, a particle reduction method breaks up the neck (interconnection) that holds the nanoparticles together.

Several techniques in a particle reduction method, when combined, can break apart the interconnection of these aggregated particles that may have been formed during calcination heat treatment, according to one example embodiment of a particle reduction method discussed below.

Calcining (by applying calcination heat treatment to) the nanoparticle materials at a temperature range that is approximately 50° C. or more according to the lowest melting point of the constituents that comprise the nanoparticle material;

Subjecting the calcined and agglomerated nanoparticles to agitation in an acid bath to dissolve nanoparticle interconnections;

Washing the nanoparticles to remove the acid residue; and

Milling the nanoparticles with a surfactant to coat the nanoparticles including primary particles, and ensure continued nanoparticle separation.

The acid bath is comprised of a liquid with a pH low enough to dissolve the particle interconnections and can be comprised of pH-adjusted ethanol or distilled water where an acid is added. An example acid in this case would be acetic acid to dissolve the calcium interconnection between the nanoparticles.

The agitation can be performed by a wide variety of processes including, but not limited to, ball milling, bead milling, sonification, or jet microfluidics.

The agitated nanoparticles may have their interconnection(s) broken to create, for example, one or more primary nanoparticles, individual nanoparticles, or nanoparticle clusters (e.g., of 50 individual nanoparticles or less).

In one embodiment, clustered nanoparticles are separated during a controlled gas evolution reaction (CGER). Nanoparticle clusters are mixed and stirred with nitric acid. The nitric acid is allowed to soak the nano clusters an embed in between the nanoparticles that comprise the nanocluster.

After sufficient soaking, an alcohol fuel such as ethanol or methanol are added to the solution.

A self-starting room temperature gas evolution reaction (CGER) occurs between the nitric acid and the fuel. The result is:

Empirical formula of Ethanol is $C_2H_{60}$
Empirical formula of Nitric acid is $HNO_3$

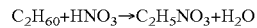

$$C_2H_{60} + HNO_3 \rightarrow C_2H_5NO_3 + H_2O$$

In one embodiment, a controlled gas evolution reaction (CGER) using a small amount of nitric acid and ethanol in a ratio of between 1:1 and 10:1 creates low temperature micro-combustions without flame, that separates the nanoparticle clusters.

In one embodiment, one or more calcine nanoparticle groupings (e.g., material including one or more agglomerated nanoparticles and/or aggregated nanoparticles) are placed into the nitric acid solution. Then ethanol fuel is added causing a controlled gas evolution reaction and subsequent near room temperature micro-combustions that break apart the nanoparticle groupings into smaller groupings and/or separate primary nanoparticles.

A CGER fluid may contain a nitrate.

A CGER fluid may contain an acid such as nitric acid.

A CGER fluid may contain an amino acid such as but not limited to glycine.

A fuel could include ethanol, methanol or propanol, or a combination thereof.

The one or more calcined nanoparticle groupings could be applied to a nitrite solution of an additional material to be applied to the nanoparticle grouping. For example, such additional material can comprise aluminum nitrite.

The one or more calcined nanoparticle groupings could be applied to an acid bath such as a nitric acid to start to break up the nanoparticle grouping and absorb in between the nanoparticles in the grouping. Then a fuel and or other chemical constituents are added to complete the combustion formula and cause a combustion reaction to break apart the nanoparticle clusters.

According to various embodiments, a CGER combustion process is not used to synthesize new materials but to separate nanoparticles that are already formed and grouped into hard nanoclusters such as agglomerates or aggregates. An example CGER combustion process can be used to break apart nanoparticle groupings.

As described above, an example nanoparticle is CCTO, which is a perovskite material.

The nanoparticles broken apart may be included in a matrix material. The matrix material may be composed of nanoparticles with reduced agglomeration (e.g., primary nanoparticles) which may be embedded in another material.

A matrix using perovskite nanoparticles can be formed in this manner. An example material for the matrix is $SiO_2$.

The matrix material can be applied as one or more of a capacitor device, an energy storage device, or a photovoltaic energy generation device, and which can be used to form a wide variety of devices.

FIG. 1 shows an example Transmission Electron Microscopy image of aggregated perovskite (CCTO) particles (101) with individual particles (102) interconnected.

Figure 2:
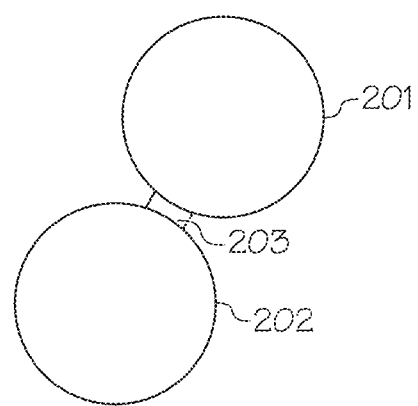
FIG. 2 is a diagram illustrating an example of an interconnection between two agglomerated nanoparticles, between two aggregated primary nanoparticles, or between an agglomerated nanoparticle and a primary nanoparticle.

FIG. 2 illustrates an example of two nanoparticles that have a hard neck interconnecting the two nanoparticles (201 and 202). The neck (203) forms from a soft chemical on the outer surface of the two nanoparticles and sticks between the two nanoparticles (201 and 202) and hardens when cooled. This neck (interconnection) (203) is formed during calcination (heat treatment) of chemicals to form a compound.

Figure 3:
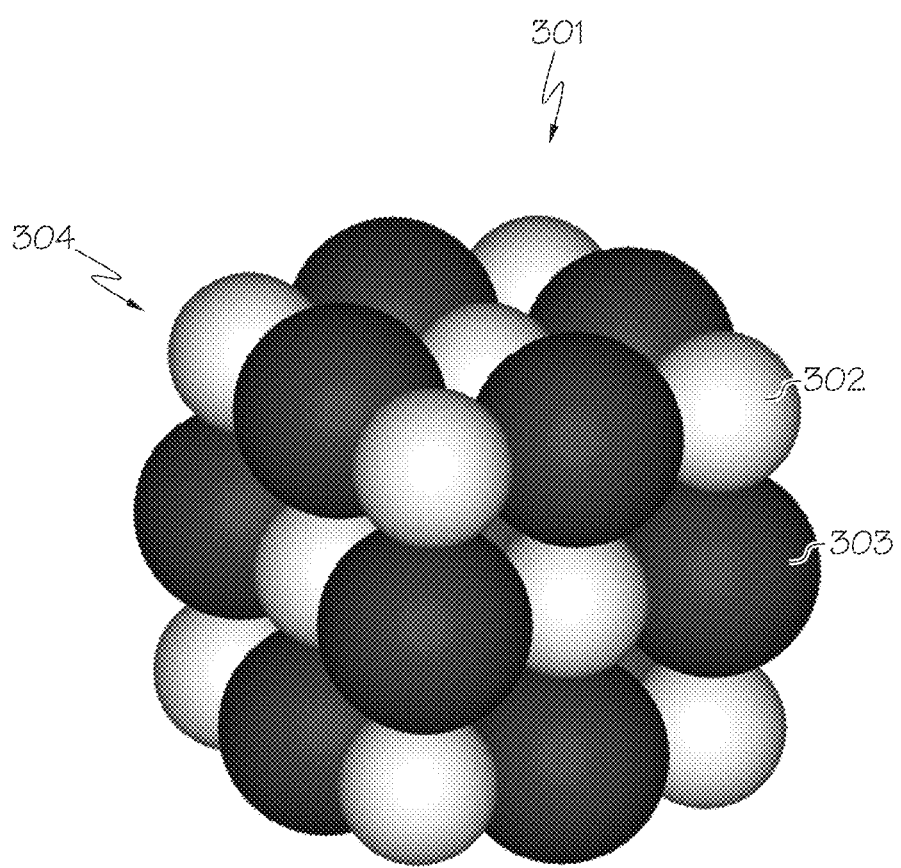
FIG. 3 is a diagram illustrating an example of a Transmission Electron Microscopy (TEM) image of perovskite (calcium copper titanium oxide or CCTO) particles and oxide particles embedded in a matrix or network.

FIG. 3 shows an example Transmission Electron Microscopy (TEM) image (301) of perovskite (CCTO) nanoparticles (302) and oxide nanoparticles (303) embedded in a matrix or network ($SiO_2$) (304). The CCTO nanoparticles (302) are separated using an acid to dissolve the calcium interconnection between the nanoparticles and thereby form individual CCTO particles (e.g., primary particles).

Figure 4:
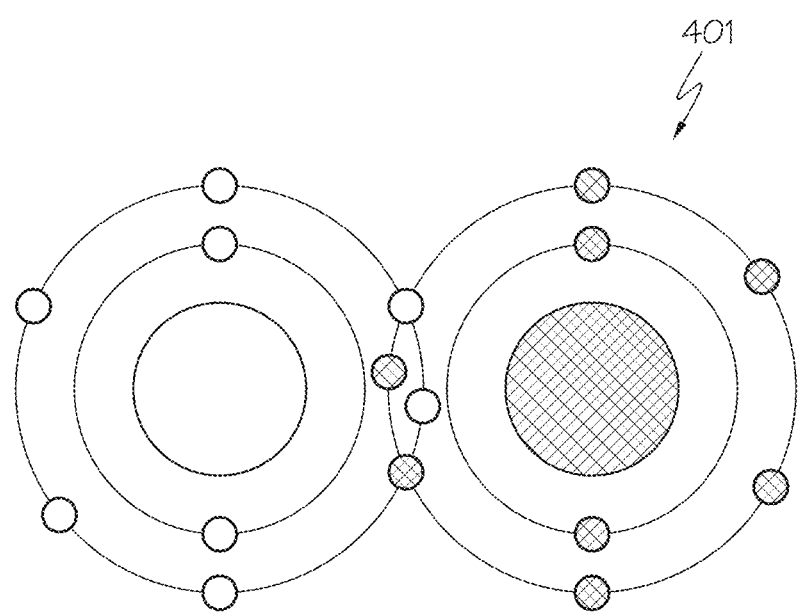
FIG. 4 is a diagram illustrating an example of ionic bonding of oxygen atoms.

FIG. 4 illustrates an example of ionic bonding of oxygen atoms.

Figure 5:
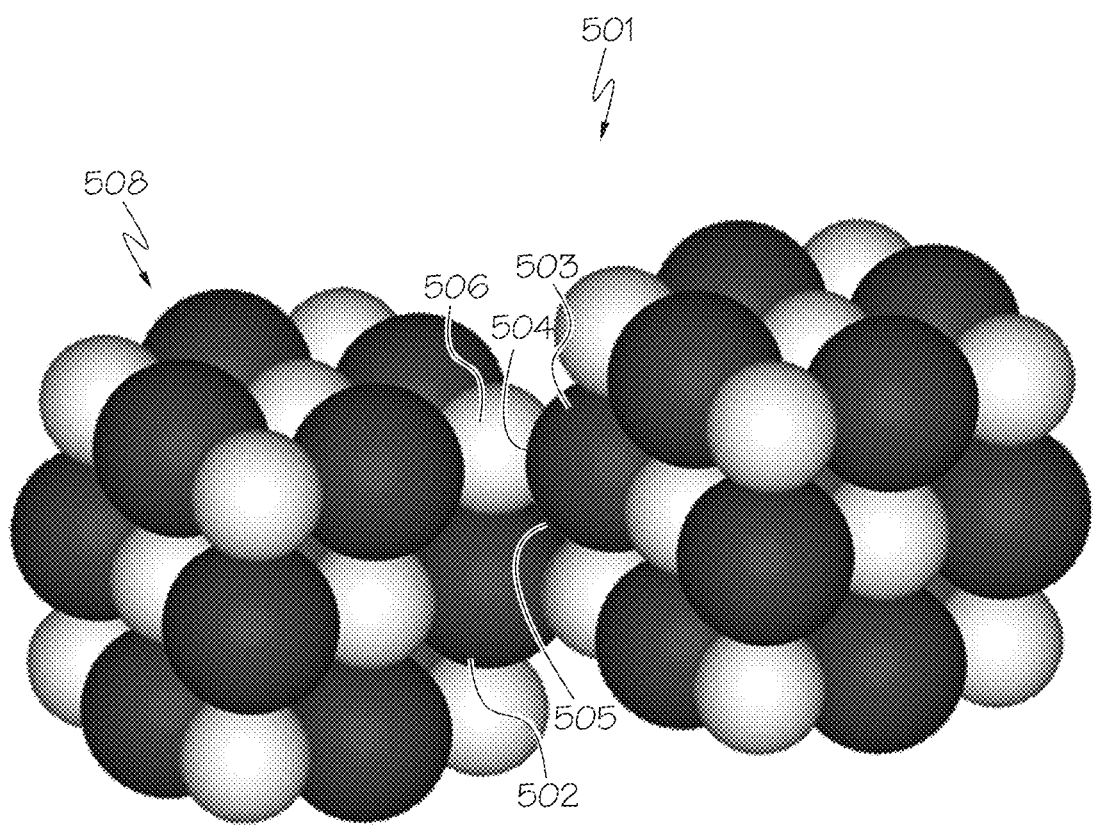
FIG. 5 is a diagram illustrating an example of particle-to-particle bonding interfaces in a matrix or network.

FIG. 5 illustrates an example of a nanoparticle to nanoparticle bonding interface (504) between an oxide nanoparticle (503) and a perovskite (CCTO) nanoparticle (506), and a nanoparticle to nanoparticle bonding interface (505) between two oxide nanoparticles (502 and 503), all in a matrix or network ($SiO_2$) (508).

Figure 6:
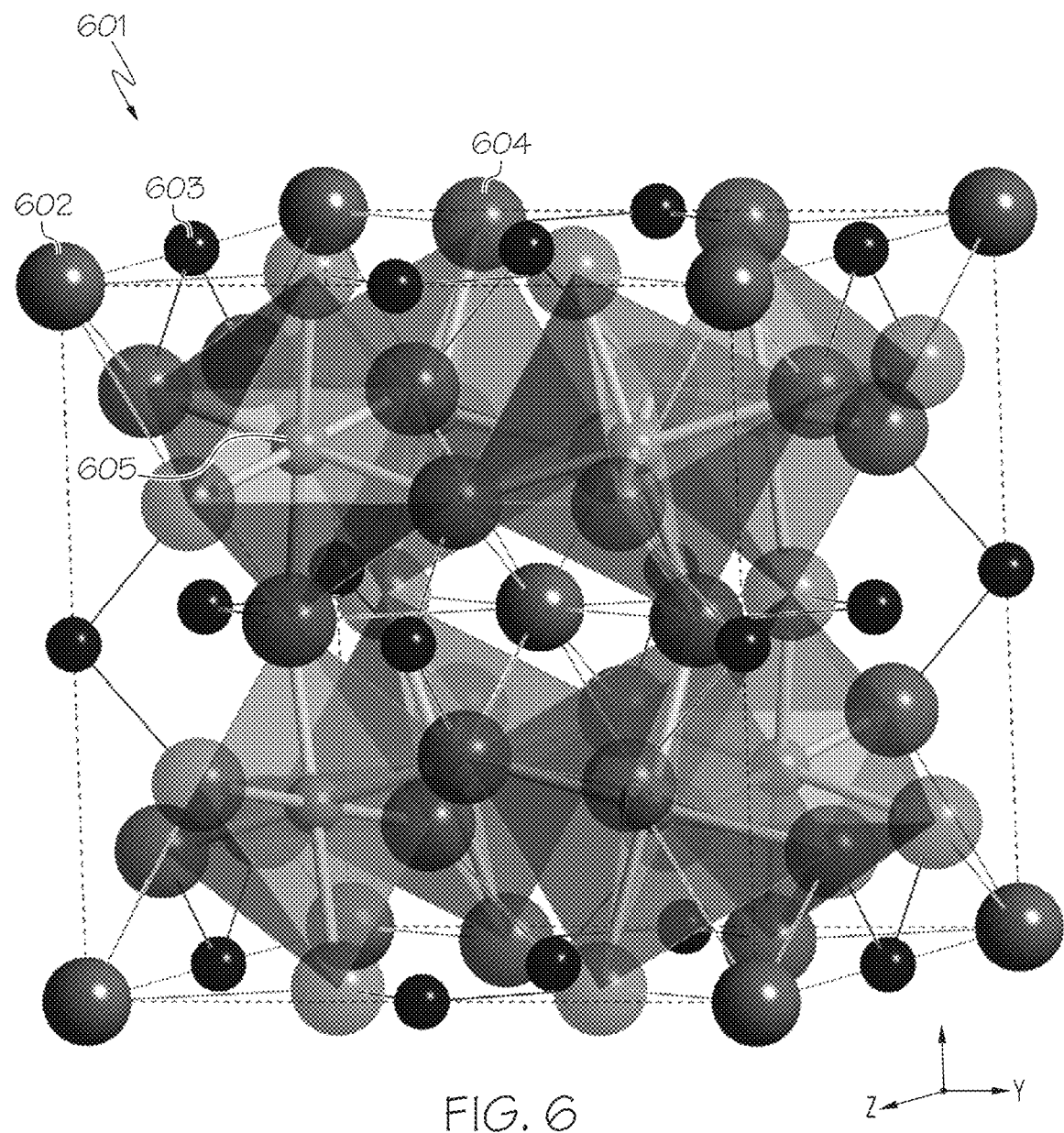
FIG. 6 is a diagram illustrating an example of a CCTO crystal structure.

FIG. 6 illustrates an example CCTO crystal structure (601) including calcium (602), copper (603), titanium (605), and oxygen (604).

Figure 7:
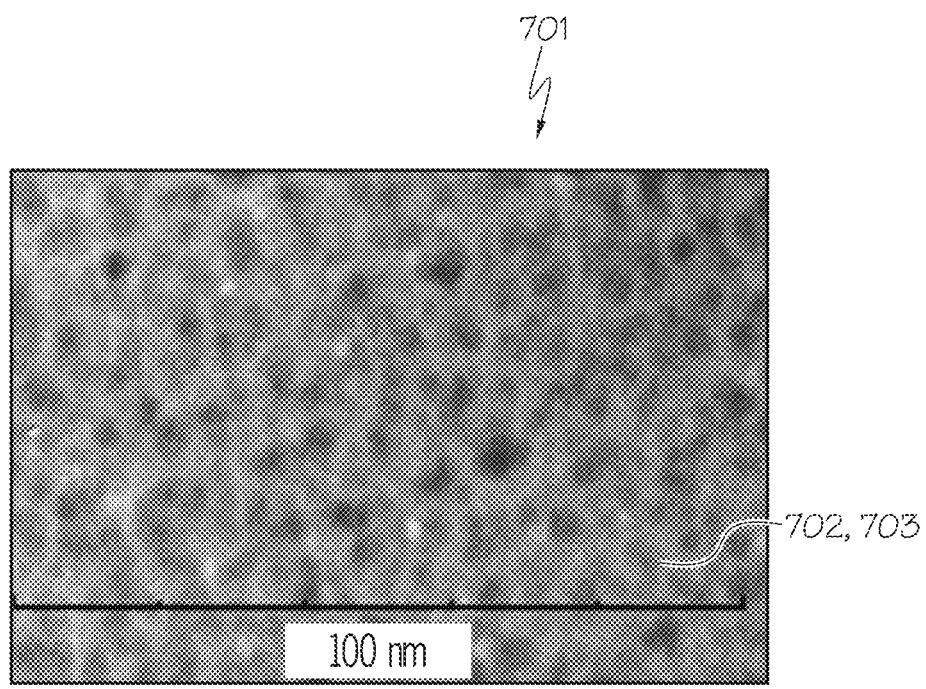
FIG. 7 is a diagram illustrating an example of a TEM image of a CCTO crystal structure showing CCTO particles reduced to primary nanoparticles in a matrix, according to an embodiment of the present invention.

FIG. 7 illustrates an example of a CCTO crystal structure (701) with CCTO particles that have been reduced to primary particles (702) in a $SiO_2$ matrix (703).

Figure 8:
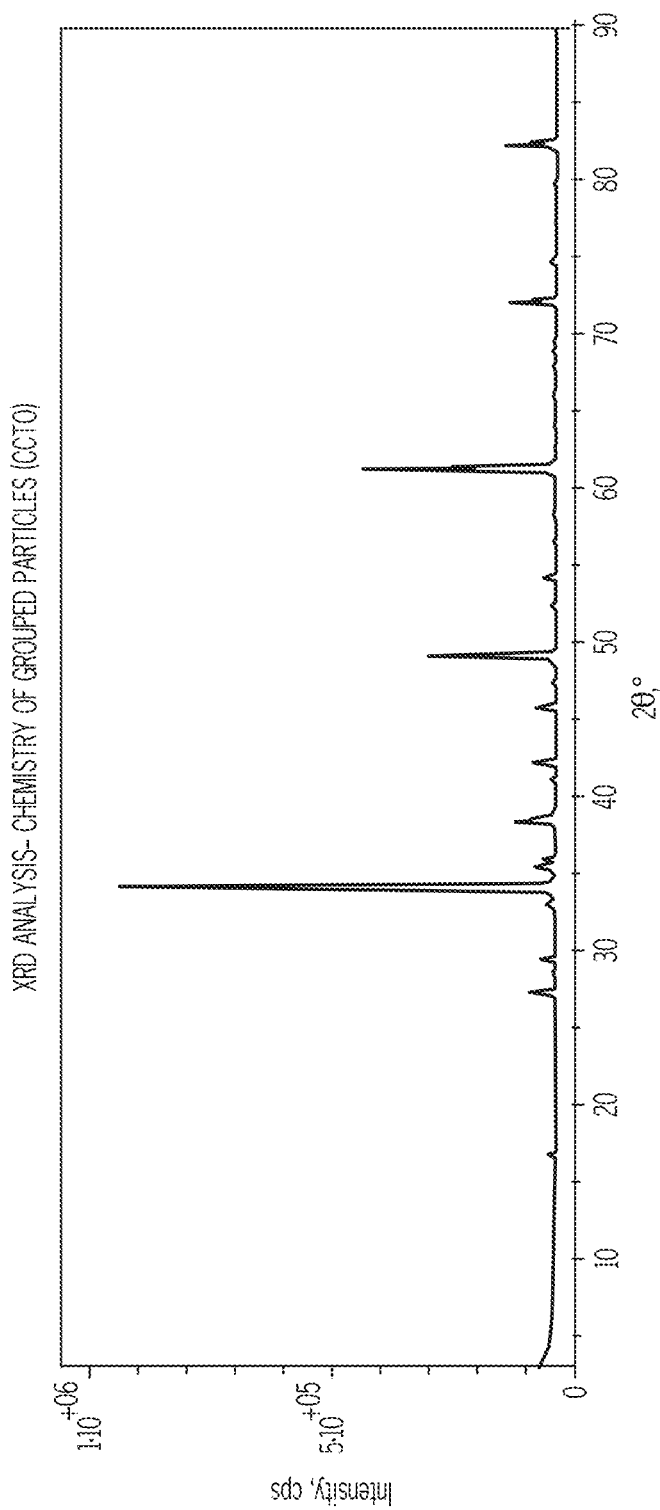
FIG. 8 is a diagram illustrating an X-Ray Diffraction (XRD) analysis of an example of CCTO material including agglomerated nanoparticles, and showing a 98% purity of CCTO crystalline phase.

FIG. 8 shows an X-Ray Diffraction analysis performed on CCTO particle agglomerates and illustrates a 98% purity of CCTO crystalline phase.

Figure 9:
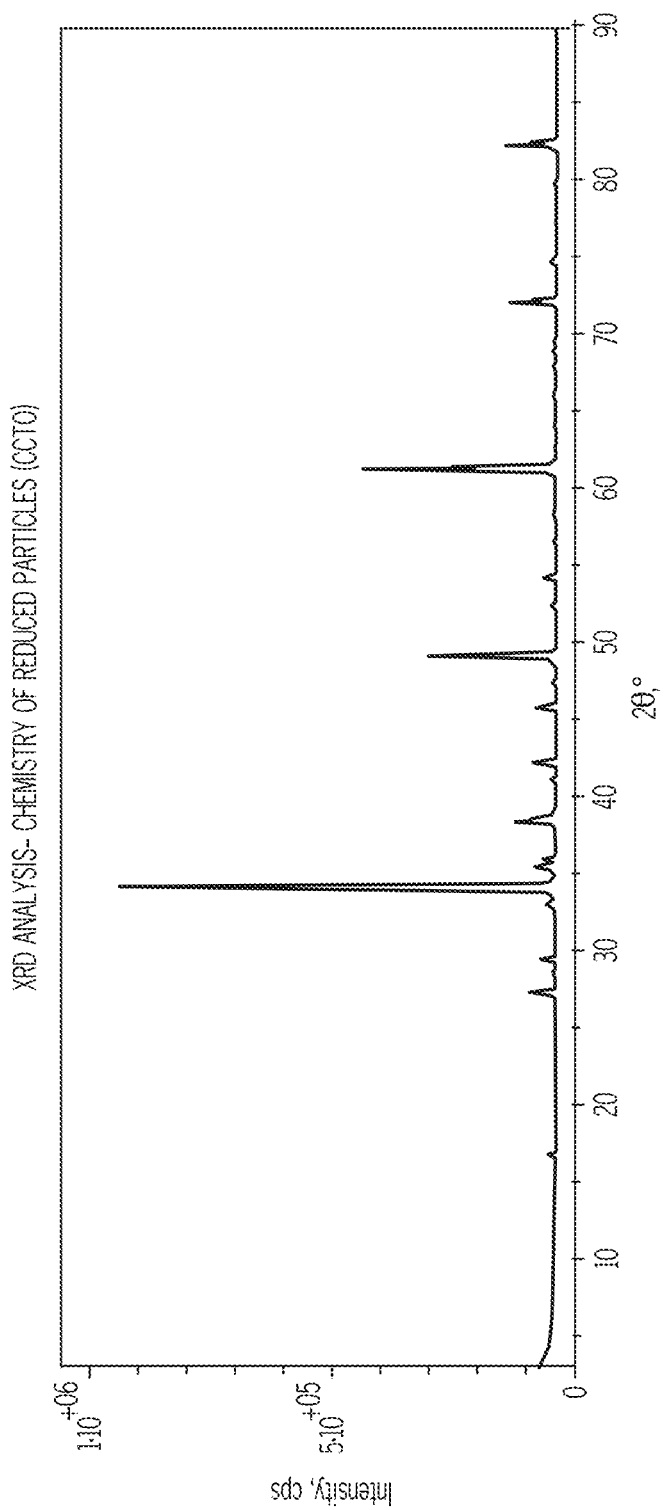
FIG. 9 is a diagram illustrating an XRD analysis of the same example of CCTO material as illustrated in FIG. 8, but has undergone nanoparticle size reduction processes as discussed herein, and showing a 98% purity of CCTO crystalline phase the same as shown for the CCTO material in FIG. 8.

FIG. 9 shows the same CCTO material as illustrated in FIG. 8 that has undergone, for example, a nanoparticle reduction process as discussed herein. As shown in the example of FIG. 9, the CCTO nanoparticle agglomerates were subjected to an acid bath (a dissolving pH solution) using nitric acid where the nitric acid absorbs in between the nanoparticles in the agglomerate. The larger nanoparticle agglomerates (e.g., nanoparticle cluster(s)) form from Van der Waals forces that group the smaller groups of nanoparticles (e.g., primary nanoparticles) together under a heated state. According to one example process, a fuel can be added to the nitric acid solution, such as ethanol, to initiate a combustion that breaks apart nanoparticle bonds and accordingly breaks apart, according to the example, a larger nanoparticle grouping (e.g., the nanoparticle cluster) into smaller groups of nanoparticles and/or separate primary nanoparticles.

Figure 10:
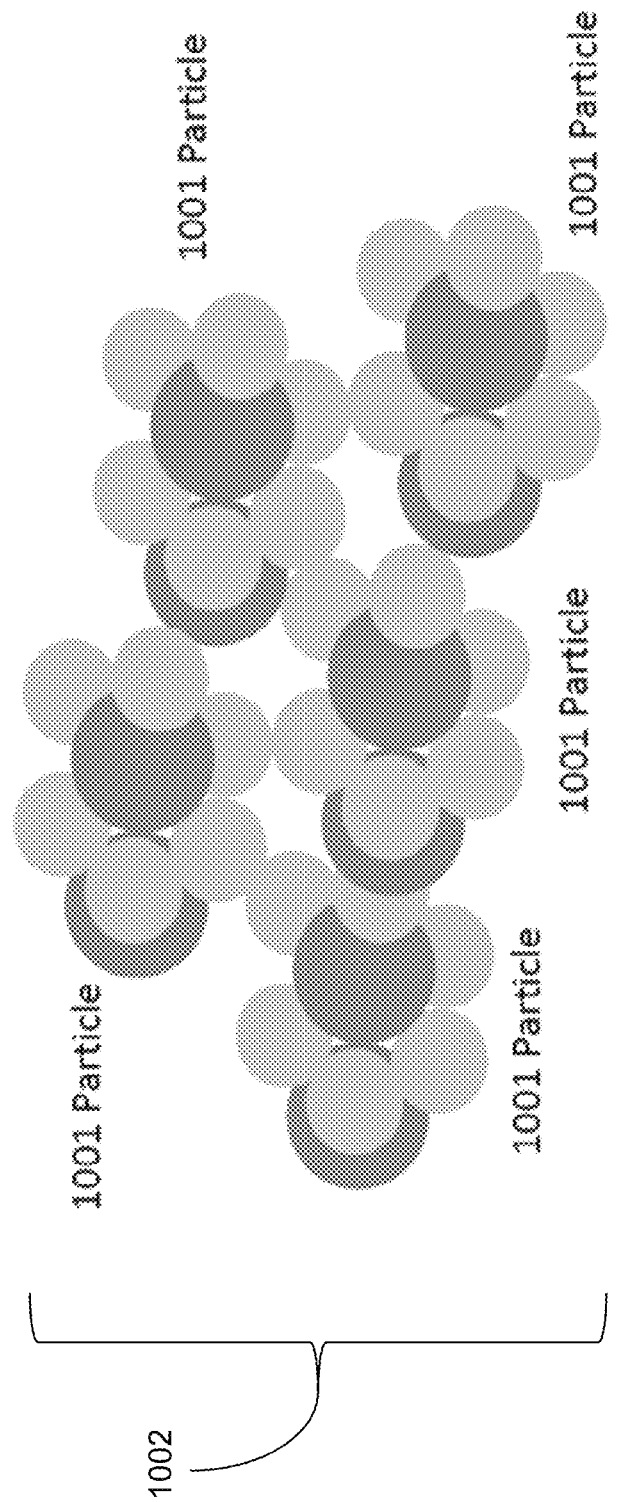
FIG. 10 is a diagram illustrating an example of a group of primary nanoparticles forming at least one larger nanoparticle cluster that can include one or more nanoparticle aggregate(s) and/or one or more nanoparticle agglomeration(s). The nanoparticle cluster can also be referred to as a nanoparticle agglomeration and/or a nanoparticle aggregation.

FIG. 10 illustrates an example of a group of primary nanoparticles 1001 forming a larger nanoparticle cluster 1002 comprising one or more nanoparticle aggregate(s) and/or one or more nanoparticle agglomeration(s). The nanoparticle aggregate(s) and/or agglomerated nanoparticles are shown clustered as a nanoparticle cluster 1002, which may also be referred to as a nanoparticle agglomeration, or a nanoparticle aggregation, or the like.

Figure 11:
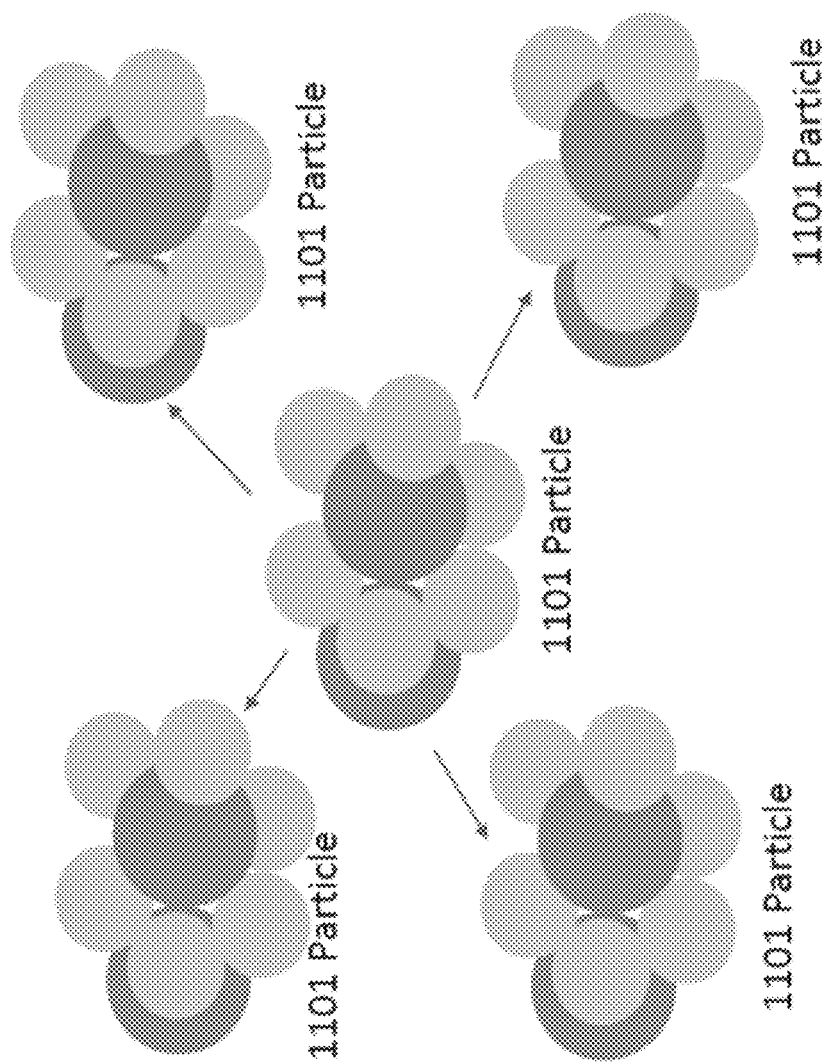
FIG. 11 is a diagram illustrating an example separation of one or more nanoparticle aggregate(s) and/or one or more nanoparticle agglomeration(s) into smaller groups of nanoparticles including one or more primary nanoparticles, based on combustion processing of the one or more nanoparticle aggregate(s) and/or one or more nanoparticle agglomeration(s). The separated nanoparticles are shown to be combusted and separated from the larger nanoparticle cluster, nanoparticle agglomeration, or nanoparticle aggregation.

FIG. 11 is a diagram illustrating the separation of one or more nanoparticle aggregate(s) and/or one or more nanoparticle agglomeration(s) into smaller groups of nanoparticles including one or more primary nanoparticles 1101, for example based on combustion processing of the one or more nanoparticle aggregate(s) and/or one or more nanoparticle agglomeration(s). The separated smaller groups of nanoparticles including one or more primary nanoparticles 1101 are shown to be separated (e.g., combusted) from a larger nanoparticle cluster, nanoparticle agglomeration, or nanoparticle aggregation.

After the one or more nanoparticle aggregate(s) and/or one or more nanoparticle agglomeration(s) are separated into smaller groups of nanoparticles, including one or more primary nanoparticles 1101, e.g., by breaking down ionic bonds between the nanoparticles, there is a likelihood that the smaller groups of nanoparticles could re-agglomerated such as under Van der Waals forces.

According to various embodiments, the separated smaller groups of nanoparticles in one example process can be placed in a pH matching solution that is close to or at the iso-electric point of the nanoparticles. A surfactant can be added to the pH matching solution and the pH matching solution is then sonicated to break up, for example, CCTO agglomerated nanoparticles, and to coat individual smaller groups of CCTO nanoparticles (e.g., primary nanoparticles) with the surfactant which avoids re-agglomeration (and tends to maintain separation of the separated smaller groups of nanoparticles including separated primary nanoparticles.

The XRD Diffraction analysis in FIG. 9 shows that the example CCTO material composed of a large percentage (e.g., at least 75% or higher percentage) of primary nanoparticles in the respective CCTO material, is still at a 98% purity. According to various embodiments, the CCTO material may be composed of at least 95% or higher percentage of primary nanoparticles in the respective CCTO material. According to various embodiments, the CCTO material may be composed of at least 99% or higher percentage of primary nanoparticles in the respective CCTO material.

FIG. 12 illustrates an example embodiment of the invention where a multi-phase heat treatment process 1202 is used to calcine heat treat, at a first step, a dielectric material (e.g., CCTO material) to form nanoparticles such as including groups (e.g., clusters) of nanoparticles 1002 as shown in FIG. 10. These groups of nanoparticles 1002 are typically agglomerated in the calcination heat treatment process.

According to this example, the process 1202 then separates by combustion, at a second step, the agglomerated nanoparticles 1002 to separate the calcined heat treated group of nanoparticles 1002 into smaller groups of nanoparticles 1101, such as primary nanoparticles and individual nanoparticles, as shown in FIG. 11. These smaller groups of nanoparticles 1101 can range less than 10 nm in diameter or can be measured less than 10 nm in a critical dimension of each of the smaller grouping of nanoparticles 1101. These smaller groups of nanoparticles 1101 can include one or more primary nanoparticles and/or one or more individual nanoparticles.

At a third step, the example process 1202 then coats the primary nanoparticles and/or individual nanoparticles with a resistive material coating (e.g., including $SiO_2$ and/or another oxide material) that can be between 1 nm to 50 nm in thickness. The example process continues calcine heat treatment of the coated nanoparticles, at a fourth step, and then raises a temperature of a heat treatment process applied to the coated nanoparticles at or near sintering heat treatment, at a fifth step. The coating around each of the sintered core shell nanoparticles of CCTO material becomes hardened (e.g., hardened coating of $SiO_2$ and/or another oxide material) to form high performance core shell nanoparticles of CCTO surrounded in a coating of resistive material.

Due to possible agglomeration of the high performance core shell nanoparticles of CCTO during the sintering heat treatment, the example process, at step 6, then separates the sintered core shell nanoparticles of CCTO, e.g., combusts the agglomerated core shell nanoparticles of CCTO 1002 to separate them, into primary nanoparticles and individual nanoparticles 1101.

In summary of the discussion above, the example process 1202, at steps 3 and 4, coats the separated individual nanoparticles with a resistive coating (e.g., including $SiO_2$ and/or another oxide material), and then applies a calcine heat treatment to the coated core shell nanoparticles, at step 4. The core shell nanoparticles are coated with a thin shell of resistive oxide material around each core shell nanoparticle. The thin shell coating can be between 1 nm to 50 nm in thickness, at step 4.

The example process then applies a sintering heat treatment to the coated core shell nanoparticles, at step 5. This sintering heat treatment forms fully sintered core shell nanoparticles of CCTO coated with a resistive coating, at step 5. Due to possible agglomeration of the high performance core shell nanoparticles of CCTO during the sintering heat treatment, at step 5, the example process then separates the sintered core shell nanoparticles of CCTO, e.g., combusts the agglomerated core shell nanoparticles, at step 6. This results in individual fully sintered core shell nanoparticles of CCTO coated with a resistive coating, at step 6.

The example process then mixes, at step 7, the fully sintered individual core shell nanoparticles directly into an organic, an inorganic, or a combined organic/inorganic material to form a resistive matrix 1204 loaded with the core shell (fully sintered) nanoparticles, at step 8.

In certain embodiments, the example process combusts, at step 6, the sintered core shell nanoparticles formed, at step 5, to further separate the sintered core shell nanoparticles into individual core shell nanoparticles, at step 6.

In various embodiments, the example process places the individual core shell (sintered) nanoparticles, at step 7, in to an organic, an inorganic or a combined inorganic/organic resistive matrix forming a loaded nanoparticle matrix, at step 8.

According to certain embodiments, the example process coats the individual nanoparticles that were separated (e.g., by combustion), at step 6, with an inorganic, an organic, or a combined inorganic/organic material, at step 7, and heat treats the nanoparticles to form a loaded matrix, at step 8.

In various embodiments, the example process attaches Tetraethyl orthosilicate (TEOS) to the individual core shell nanoparticles. TEOS has the chemical compound formula $Si(OC_2H_5)_4$ and is a precursor to Silicon Dioxide ($SiO_2$).

TEOS converts to $SiO_2$ at approximately 600° C. and can be used to form an amorphous matrix.

The example process, according to various embodiments, activates the surface area of the individual core shell nanoparticles to attract and hold resistive nanoparticles, at step 7, that can create a resistive matrix 1204, at step 8, when heated, to hold the individual core shell nanoparticles in the matrix 1204.

In certain embodiments, the example process uses a surfactant such as but not limited to poly ethyl glycol (PEG) to attach to the outer surface of the individual core shell nanoparticles, at step 7, and to attract and hold nanoparticles that are present in the mixture, such as $Al_2O_3$ or $Si_3N_4$ or $SiO_2$ nanoparticles.

When heated, the PEG evaporates and leaves resistive nanoparticles behind to form the matrix, at step 8.

In certain embodiments, the example process separates (e.g., by a combustion process as discussed herein) the individual fully sintered nanoparticles and primary nanoparticles, at step 6, and then optionally coats, at step 7, the individual fully sintered nanoparticles and primary nanoparticles with a surfactant that separates and maintains separated (e.g., avoiding interfacial contact between) the individual nanoparticles. The surfactant coating allows the individual nanoparticles to remain separated during mixing of the individual nanoparticles into a matrix material, at steps 7 and 8, and with heat treatment forming nanoparticles in a matrix 1204. When heated, the surfactant typically evaporates and leaves resistive nanoparticles behind to form the matrix, at step 8.

Alternatively, in certain embodiments, the optional step of coating with a surfactant the individual fully sintered nanoparticles and primary nanoparticles can be avoided at step 7, and the individual fully sintered nanoparticles and primary nanoparticles are mixed with a resistive matrix coating material and heat treated, which forms, at steps 7 and 8, the nanoparticles in the matrix 1204.

The dielectric nanoparticles can be perovskite materials forming an internal layer barrier capacitor material when sintered.

The perovskite material can be calcium copper titanate (CCTO) with varying stoichiometry and can be doped with various materials such as $Al_2O_3$, Ru, or La.

The shell of the core shell particles can be a resistive material such as $SiO_2$.

The matrix, according to various embodiments, can be an organic matrix comprised of $SiO_2$, $Si_3N_4$, or a combination of $SiO_2$ and $Si_3N_4$.

The matrix, in certain embodiments, can be an inorganic polymer material. The use of an inorganic matrix material allows for fabrication of polymer thin films filled with core shell dielectrums. When distributed in a matrix, these dielectrum particles provide increased resistivity, permittivity, and breakdown voltage, compared to other dielectric particles in a matrix. Many different new applications of this inorganic polymer material are possible.

The features and advantages described in the specification are not all inclusive, and particularly, many additional features and advantages will be apparent to one of ordinary skill in the art in view of the description, specification and claims hereof.

Moreover, it should be noted that the language used in the specification has been principally selected for readability and instructional purposes, and may not have been selected to delineate or circumscribe the inventive subject matter, resort to the claims being necessary to determine such inventive subject matter. Although specific embodiments of the subject matter have been disclosed herein, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

Summary of Various Non-Limiting Example Embodiments

One example, according to various embodiments of the present invention, includes a modified internal barrier layer capacitor material comprising:

a base material comprising unmodified internal barrier layer capacitor material having grain boundaries;

first and second resistive materials bonded to the grain boundaries of the base material to form modified grain boundaries of the base material, wherein the first resistive material is bonded to grain boundaries of the base unmodified internal barrier layer capacitor material forming a grain boundary composition which includes nanoparticles of the first resistive material added to nanoparticles of the unmodified internal barrier capacitor material, and wherein the second resistive material is bonded to grain boundaries of the grain boundary composition forming a modified internal barrier layer capacitor material which includes nanoparticles of the second resistive material added to nanoparticles of the grain boundary composition; and an amorphous region in between the grain boundaries of the modified internal barrier layer capacitor material, the amorphous region including nanoparticles of the at least one of the first and second resistive materials, wherein at least one of the base material, the first resistive material, or the second resistive material, comprises at least 75% or higher percentage of primary nanoparticles in the respective at least one of the base material, the first resistive material, or the second resistive material.

When applied in a matrix, the above modified internal barrier layer capacitor materials are isolated from one another in the matrix. Various embodiments of the present particle reduction method enable reduction of nanoparticle sizes of one or more nanoparticle groupings in material (when measured in a critical dimension of the nanoparticle or nanoparticle cluster) that are less than or equal to 500 nm, less than or equal to 100 nm, less than or equal to 50 nm, less than or equal to 20 nm, or less than or equal to 10 nm, depending on the application of the novel particle reduction method discussed herein for reduction of size of nanoparticle grouping (e.g., including one or more agglomerated nanoparticles and/or aggregated nanoparticles) in a material, depending on a chemistry of the material, and depending on calcination temperatures applied to the material, before the nanoparticles are encased in the matrix.

In one example, according to various embodiments, the modified internal barrier layer capacitor material includes two phases of Calcium Copper Titanium oxides: Calcium Copper Titanate (CCTO): $CaCu_3Ti_4O_{12}$ and Calcium Tricopper Tetratita (CTT): $CaCu_3O_{12}Ti_{14}$ resulting in a two phase internal barrier layer capacitor material, a first resistive material is applied to the grain boundaries of both internal barrier layer materials thereby resulting in a grain boundary composition on each; and a second resistive material is bonded to the grain boundary composition of each internal barrier layer material thereby resulting in the modified dual phase internal barrier layer capacitor material, wherein at least one of the base material, the first resistive material, or the second resistive material, comprises at least 75% or higher percentage of primary nanoparticles in the respective at least one of the base material, the first resistive material, or the second resistive material.

In another example, according to various embodiments, the modified internal barrier layer capacitor material is comprised of ultra-thin grains that measure less than 50 nm in diameter (or that measure less than 50 nm in a critical dimension of the nanoparticle) which are hereby known as Dielectrum particles.

When distributed in a matrix, these Dielectrum particles provide increased resistivity, permittivity, and breakdown voltage, compared to other dielectric particles in a matrix.

In another example, according to various embodiments, the modified internal barrier layer capacitor material includes the unmodified internal barrier layer capacitor material which is based on Calcium Copper Titanate (CCTO);

the first resistive material is Aluminum Oxide ($Al_2O_3$) resulting in $CCTO/CuAl_2O_4$ as the grain boundary composition; and the second resistive material is Silicon Dioxide ($SiO_2$) resulting in $CCTO/CuAl_2SiO_6$ as the modified internal barrier layer capacitor material.

After calcination and or sintering of the modified internal barrier layer capacitor material there may be other phases that are include such as, but not limited to, rutile ($TiO_2$), walstromite ($CaSiO_3$), corundum ($Al_2O_3$), tenorite (CuO), copper aluminum oxide ($CuAl_2O_4$), and silicon oxide ($SiO_2$). At least one of the base material, the first resistive material, or the second resistive material, comprises, according to various embodiments, at least 75% or higher percentage of primary nanoparticles.

In one example, according to various embodiments, the additional Silicon Dioxide results in the matrix for suspension of the modified internal barrier layer capacitor material.

In another example of the modified internal barrier layer capacitor material, according to various embodiments, an unmodified internal barrier layer capacitor material is based on Calcium Copper Titanate (CCTO);

the first resistive material is 2% to 15% wt. Aluminum Oxide ($Al_2O_3$) resulting in $CCTO/CuAl_2O_4$ as the grain boundary composition; and the second resistive material is 10% to 30% wt. Silicon Dioxide ($SiO_2$) resulting in $CCTO/CuAl_2SiO_6$ as the modified internal barrier layer capacitor material, wherein at least one of the base material, the first resistive material, or the second resistive material, comprises at least 75% or higher percentage of primary nanoparticles in the respective at least one of the base material, the first resistive material, or the second resistive material.

Another example includes, according to various embodiments, modified internal barrier layer capacitor material where the unmodified internal barrier layer capacitor material (base material) is a modified stoichiometry of Calcium Copper Titanium Oxide (CCTO-XS), the first resistive material is Aluminum Oxide ($Al_2O_3$), and the second resistive material is Silicon Dioxide ($SiO_2$), and wherein at least one of the base material, the first resistive material, or the second resistive material, comprises at least 75% or higher percentage of primary nanoparticles in the respective at least one of the base material, the first resistive material, or the second resistive material.

Another example includes, according to various embodiments, modified internal barrier layer capacitor (IBLC) material wherein the internal barrier layer capacitor grain growth, when sintering, is inhibited by the depletion of a portion of the copper, titanium, and calcium from the grain boundary resulting from secondary phases of $CuAl_2O_4$, TiSiO and CaSiO, and wherein at least one of the base material, the first resistive material, or the second resistive material, comprises at least 75% or higher percentage of primary nanoparticles in the respective at least one of the base material, the first resistive material, or the second resistive material.

Another example includes, according to various embodiments, modified internal barrier layer capacitor (IBLC) material wherein the primary IBLC grain growth is a result of calcination temperatures and dwell times during CCTO calcination and during the addition of the first resistive oxide through the second calcination, and wherein at least one of the base material, the first resistive material, or the second resistive material, comprises at least 75% or higher percentage of primary nanoparticles in the respective at least one of the base material, the first resistive material, or the second resistive material.

An energy storage device based on a multilayer ceramic capacitor device as described in the examples discussed herein can be described as a Dense Energy Ultra-Cell Element (DEUC Element).

The DEUC Element is a building block used to create, according to various embodiments, one or more of the following:

a DEUC Cell
where one or more DEUC Elements are connected in series and/or in parallel circuit(s) to form a DEUC Cell, and
A Dielectric Energy Storage Module (DESM)
where one or more DEUC Cells are combined and interconnected in series and/or in parallel circuit(s) to form a DESM, and
a DESM Array
where one or more DESMs are combined and interconnected in series and/or parallel circuit(s) to form a Dielectric Energy Storage System (DESS) Array.

The DEUC Element, DEUC Cell, DESM and DESS Array, according to various embodiments, can be applied to store and provide electrical power to at least one of: micro devices and integrated circuits, electric vehicles, aircraft, boats, ships, unmanned aerial, terrestrial or water vehicles, electronic cigarettes, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies.

Description of Several Example Embodiments

A method of reducing the size of nanoparticle groupings, such as agglomerated nanoparticles or nanoparticle aggregates, the method comprises:

Placing the one or more calcine heated and formed nanoparticle grouping(s) in a controlled gas evolution reaction fluid with micro-combustions occurring during the controlled gas evolution process. The micro-combustions cause the nanoparticle interconnections at interfaces of a plurality of nanoparticles in the one or more nanoparticle groupings to separate. The combustion reduces the nanoparticle groupings to smaller nanoparticle groupings or primary particles. The smaller nanoparticle groupings or primary particles have the same chemical make up as the original larger nanoparticle grouping.

The plurality of nanoparticles are placed in a acid bath to create a combustion solution where:
Nitric acid absorbs in between the nanoparticles in the cluster; and
A fuel such as ethanol is added to the acid bath to initiate a combustion.

The plurality of nanoparticles is placed in an acid bath to create a combustion solution where:
Aluminum nitrate absorbs in between the nanoparticles in the cluster; and
A fuel such as ethanol is added to the aluminum nitrate bath to initiate a combustion.

In one embodiment, the plurality of nanoparticles is placed in a pH matching solution, where a pH of the pH matching solution is adjusted to match an iso-electric point of the plurality of nanoparticles;
adding a surfactant to the pH matching solution with the plurality of nanoparticles to separate the plurality of nanoparticles, coat with the surfactant the separated plurality of nanoparticles, and maintain nanoparticle separation in the separated plurality of nanoparticles; and
agitation of the plurality of nanoparticles and surfactant in the pH matching solution to yield at least one of clustered nanoparticles or primary nanoparticles.

In another embodiment, the combustible mixture includes a nitrate of a chemical to be added to the nanoparticle group.

In another embodiment, the combustible solution contains one or more of an ethanol liquid, a propanol liquid, or a solvent liquid. The agitation is performed by at least one of stirring, ball milling, bead milling, sonification, or jet microfluidics.

In another embodiment, a heated surface of one or more of the calcine heated nanoparticle groupings becomes soft and forms a hard interconnection between the plurality of nanoparticles in the one or more calcine heated nanoparticle groupings at an interfacial contact of the plurality of nanoparticles when cooled.

The one or more calcine heated nanoparticle groupings includes one or more agglomerated nanoparticles and/or aggregated nanoparticles, formed as a Van der Waals formation of nanoparticles.

In another embodiment, the one or more calcine heated nanoparticle groupings includes one or more agglomerated nanoparticles and/or aggregated nanoparticles, formed as one or more of:
an ionic bond between oxygen atoms of adjacent nanoparticles; or
a covalent bond between metal and non-metal atoms of adjacent nanoparticles; or
a metallic bond between atoms of adjacent nanoparticles.

In one embodiment, the one or more calcine heated nanoparticle groupings is reduced to primary nanoparticles.

In another embodiment, an agglomeration of nanoparticles is reduced to nanoparticle clusters of ten individual nanoparticles or less.

In another embodiment, the plurality of nanoparticles includes at least one primary nanoparticle that comprises perovskite material.

In another embodiment the plurality of nanoparticles is a perovskite material that is distributed in a resistive material and together heat treated to form internal barrier layer capacitor particles suspended in a resistive matrix and where the internal barrier layer capacitor nanoparticles have diameters of less than 20 nm and where said internal barrier layer nanoparticles suspended in the matrix are defined as dielectrum particles in an energy storage matrix.

In one embodiment the dielectrum particles of the internal barrier layer capacitor material is comprised of calcium copper titanate (CCTO). In another embodiment, the resistive matrix material is $SiO_2$.

In one embodiment, the dielectric energy storage material is comprised of:
a base dielectrum material comprising an internal barrier layer capacitor material having grain boundaries;
one or more resistive materials bonded to the grain boundaries of the base material to form modified grain boundaries of the base material, wherein a first resistive material of the one or more resistive materials is bonded to grain boundaries of the unmodified internal barrier layer capacitor material forming a modified internal barrier layer capacitor material which includes nanoparticles of the one or more resistive materials added to nanoparticles of the base internal barrier capacitor material; and
an amorphous region in between the grain boundaries of the modified internal barrier layer capacitor material, the amorphous region including nanoparticles of the one or more resistive materials, and
wherein at least one of the dielectrum base material and the one or more resistive materials, comprises at least 75% or higher percentage of primary nanoparticles, in the respective at least one of the base material and the one or more resistive materials, and
where the dielectrum internal barrier layer capacitor materials are suspended in a resistive matrix, and In another embodiment a multilayer ceramic capacitor is comprised of:
at least one first electrode;
at least one second electrode; and
a dielectric energy storage layer comprised of dielectrum particles suspended in an $SiO_2$ matrix; and
wherein the at least one first electrode and the at least one second electrode are interleaved between the plurality of dielectric energy storage layers and
wherein each of the plurality of dielectric energy storage layers is less than 20 microns thick.

What is claimed is:

1. A method of reducing a size of nanoparticle groupings in a plurality of nanoparticles that are at least one of agglomerated nanoparticles or aggregated nanoparticles, the method comprises:
mixing a plurality of nanoparticles comprising one or more calcine heated and formed nanoparticle groupings, including at least one of agglomerated nanoparticles or aggregated nanoparticles, with an acid and a fuel, in a controlled gas evolution reaction fluid;
wherein micro-combustions are initiated in the controlled gas evolution reaction fluid based on the mixing of the acid and the fuel, and wherein the micro-combustions occur during a controlled gas evolution process; and
wherein the micro-combustions cause nanoparticle interconnections at interfaces of the plurality of nanoparticles to be broken and to separate the plurality of nanoparticles creating at least one primary nanoparticle and/or one or more of: primary nanoparticles, individual nanoparticles, or nanoparticle clusters, in the plurality of nanoparticles; and
wherein the micro-combustions reduce larger nanoparticle groupings to smaller nanoparticle groupings and including at least one primary nanoparticle in the plurality of nanoparticles.

2. The method claim 1, wherein the controlled gas evolution process comprises:
the plurality of nanoparticles is placed in an acid bath comprising the acid which includes nitric acid;
the nitric acid, from the acid bath, absorbs in between nanoparticles in the at least one of agglomerated nanoparticles or aggregated nanoparticles; and
the fuel is added to the acid bath to initiate the micro-combustions.

3. The method of claim 2, wherein the fuel comprises ethanol.

4. The method of claim 1, where the plurality of nanoparticles is placed in an acid bath comprising the acid and which includes aluminum nitrate, wherein:
aluminum nitrate, from the acid bath, absorbs in between nanoparticles in the at least one of agglomerated nanoparticles or aggregated nanoparticles; and
the fuel is added to the acid bath to initiate the micro-combustions.

5. The method of claim 4, wherein the fuel comprises ethanol.

6. The method of claim 1, further comprising:
placing, after the controlled gas evolution process, the plurality of nanoparticles in a pH matching solution, where a pH of the pH matching solution is adjusted to match an iso-electric point of the plurality of nanoparticles;
adding a surfactant to the pH matching solution with the plurality of nanoparticles, the surfactant separating the plurality of nanoparticles, individually coating with the surfactant one or more of: primary nanoparticles, individual nanoparticles, or nanoparticle clusters, in the plurality of nanoparticles that were separated,
maintaining nanoparticle separation in the plurality of nanoparticles that were separated by the surfactant; and
agitating the plurality of nanoparticles that were separated by the surfactant and the surfactant in the pH matching solution to yield at least one of clustered nanoparticles, primary nanoparticles, or individual nanoparticles.

7. The method of claim 6, wherein the agitating comprises at least one of stirring, ball milling, bead milling, sonification, or jet microfluidics.

8. The method of claim 1, wherein the controlled gas evolution reaction fluid includes a nitrate combined with the acid in an acid bath which is mixed with the plurality of nanoparticles.

9. The method of claim 1, wherein the controlled gas evolution reaction fluid includes one or more of an ethanol liquid, a propanol liquid, or a solvent liquid.

10. The method of claim 1, further comprising, before the mixing of the acid and the fuel, a calcination heat treatment process wherein a heated surface of one or more of the calcine heated and formed nanoparticle groupings becomes soft and when cooled forms a hard interconnection between the plurality of nanoparticles at an interfacial contact of the plurality of nanoparticles.

11. The method of claim 1, wherein the one or more calcine heated and formed nanoparticle groupings includes one or more agglomerated nanoparticles and/or aggregated nanoparticles, formed as a Van der Waals formation of nanoparticles.

12. The method of claim 1, wherein the one or more calcine heated and formed nanoparticle groupings includes one or more agglomerated nanoparticles and/or aggregated nanoparticles, formed as one or more of:
   an ionic bond between oxygen atoms of adjacent nanoparticles;
   a covalent bond between metal and non-metal atoms of adjacent nanoparticles; or
   a metallic bond between atoms of adjacent nanoparticles.

13. The method of claim 1, wherein at least one of the one or more calcine heated and formed nanoparticle groupings is reduced to one or more primary nanoparticles.

14. The method of claim 1, wherein an agglomeration of nanoparticles in the plurality of nanoparticles is reduced, by the micro-combustions, to at least one smaller nanoparticle cluster of ten individual nanoparticles or less.

15. The method of claim 1, wherein the plurality of nanoparticles includes at least one primary nanoparticle that comprises perovskite material.

16. The method of claim 1, wherein the plurality of nanoparticles comprises a perovskite material, and the method further comprises, after at least one micro-combustion of the micro-combustions, distributing the perovskite material in a resistive material and heat treating the distributed perovskite material in the resistive material to form nanoparticles of an internal barrier layer capacitor material suspended in a resistive matrix, and where the internal barrier layer capacitor material comprises at least one primary nanoparticle that has a diameter of less than 20 nm, and wherein nanoparticles of said internal barrier layer capacitor material are suspended in a matrix and include at least one dielectrum in an energy storage matrix.

17. The method of claim 16, wherein the at least one dielectrum is comprised of calcium copper titanate (CCTO).

18. The method of claim 16, wherein the resistive material comprises $SiO_2$.

19. The method of claim 16, wherein the at least one dielectrum comprises:
   a base dielectrum material comprising an internal barrier layer capacitor material having grain boundaries;
   one or more resistive materials bonded to the grain boundaries of the base dielectrum material that form modified grain boundaries of the base dielectrum material, wherein a first resistive material of the one or more resistive materials is bonded to grain boundaries of an unmodified internal barrier layer capacitor material forming a modified internal barrier layer capacitor material which includes nanoparticles of the one or more resistive materials added to nanoparticles of the internal barrier layer capacitor material of the base dielectrum material;
   an amorphous region in between the grain boundaries of the modified internal barrier layer capacitor material, the amorphous region including nanoparticles of the one or more resistive materials;
   wherein the base dielectrum material and the one or more resistive materials, comprise at least 75% or higher percentage of primary nanoparticles, in the respective at least one of the base dielectrum material and the one or more resistive materials; and
   wherein the base dielectrum material comprising the internal barrier layer capacitor material, is suspended in a resistive matrix.

20. A method of reducing a size of nanoparticle groupings in a plurality of nanoparticles, the method comprises:
   mixing a plurality of nanoparticles comprising one or more calcine heated and formed nanoparticle groupings, including at least one of agglomerated nanoparticles or aggregated nanoparticles, with an acid and a fuel, in a controlled gas evolution reaction fluid, wherein the acid in the mixture has a ratio approximately ninety (90) percent to approximately fifty (50) percent relative to the fuel in the mixture;
   wherein micro-combustions are initiated in the controlled gas evolution reaction fluid based on the mixing of the acid and the fuel, and wherein the micro-combustions occur during a controlled gas evolution process, in which nanoparticle interconnections at interfaces of the plurality of nanoparticles are broken and one or more primary nanoparticles are separated from the at least one of agglomerated nanoparticles or aggregated nanoparticles in the plurality of nanoparticles; and
   wherein the micro-combustions reduce larger nanoparticle groupings to smaller nanoparticle groupings including at least one primary nanoparticle in the plurality of nanoparticles.

21. The method of claim 20, wherein the plurality of nanoparticles comprises a perovskite material, and the method further comprises, after at least one micro-combustion of the micro-combustions, distributing the perovskite material in a first resistive material with at least one primary nanoparticle or individual nanoparticle being encapsulated in the first resistive material forming a core shell nanoparticle material, and together are heat treated to harden a shell material of the core shell nanoparticle material, and combined with a second resistive material to form a loaded matrix that is loaded with the core shell nanoparticle material, and which the loaded matrix is heat treated to form a hardened loaded matrix material comprising a dielectric energy storage material matrix.

22. The method of claim 21, wherein the dielectric energy storage material matrix comprises:
   internal barrier layer capacitor material nanoparticles individually encapsulated in the first resistive material forming core shell nanoparticles in a core shell nanoparticle material, and the method further comprising:
   wherein the core shell nanoparticles material is heat treated to between 600° C. to 1,000° C. hardening a shell material of the core shell nanoparticles,
   wherein the core shell nanoparticles material is further heated to between 900° C. to 1,100° C. sintering core material of the core shell nanoparticles forming fully sintered core shell nanoparticles material,
   wherein the fully sintered core shell nanoparticles material is combined with a resistive material forming a loaded matrix that is loaded with the core shell nanoparticle material, and
   wherein the loaded matrix is heat treated forming a hardened matrix material comprising a dielectric energy storage material matrix.

23. The method of claim 22, wherein the core of the core shell nanoparticles is comprised of calcium copper titanate (CCTO), the shell is comprised of $SiO_2$, and the loaded matrix is comprised of $SiO_2$.

24. The method of claim 22, wherein the core of the core shell particles is comprised of calcium copper titanate (CCTO) doped with one or more of the following materials: $Al_2O_3$ (Aluminium Oxide), Ru (Ruthenium), La (Lanthanum), or $TeO_2$ (Tellurium oxide).

* * * * *